(12) United States Patent
Urushihara et al.

(10) Patent No.: US 7,860,047 B2
(45) Date of Patent: Dec. 28, 2010

(54) WIRELESS COMMUNICATION APPARATUS AND COMUNICATION QUALITY ESTIMATING METHOD

(75) Inventors: Tomoya Urushihara, Chiba (JP); Takenori Sakamoto, Tokyo (JP); Katsuaki Abe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1073 days.

(21) Appl. No.: 11/597,054

(22) PCT Filed: May 27, 2005

(86) PCT No.: PCT/JP2005/009768

§ 371 (c)(1),
(2), (4) Date: Nov. 20, 2006

(87) PCT Pub. No.: WO2005/117279

PCT Pub. Date: Dec. 8, 2005

(65) Prior Publication Data

US 2007/0223393 A1        Sep. 27, 2007

(30) Foreign Application Priority Data

May 28, 2004   (JP) .............................. 2004-160333
May 26, 2005   (JP) .............................. 2005-154651

(51) Int. Cl.
*H04Q 7/00*        (2006.01)
(52) U.S. Cl. ...................... 370/328; 370/338; 370/445; 455/550.1; 455/63.11
(58) Field of Classification Search ................. 370/338, 370/445, 328; 455/550.1, 63.11
See application file for complete search history.

(56) References Cited

U.S. PATENT DOCUMENTS

| 6,058,312 A | 5/2000 | Kimura |
| 7,426,370 B2 | 9/2008 | Nakao |

(Continued)

FOREIGN PATENT DOCUMENTS

| CN | 1429437 | 7/2003 |
| JP | 9172430 | 6/1997 |
| JP | 2001217853 | 8/2001 |
| JP | 2002112347 | 4/2002 |
| JP | 2003199160 | 7/2003 |
| JP | 2004363728 | 12/2004 |

OTHER PUBLICATIONS

PCT International Search Report dated Sep. 13, 2005.
Chinese Office Action dated Mar. 13, 2009.

*Primary Examiner*—Danh C Le
(74) *Attorney, Agent, or Firm*—Dickinson Wright PLLC

(57) ABSTRACT

Based on a received signal of a wireless communication system currently used for communication, a communication quality in a case of switching to another wireless communication system for communication is efficiently and precisely estimated. A communication quality estimating part (201) subjects both a known signal received, by use of a first wireless communication system, from a radio part (200) and a reference signal outputted from a reference signal storage part (203) to a conversion processing unique to a second wireless communication system for comparison, thereby artificially estimating the communication quality in a case of using a second wireless communication system for communication under the same wireless transmission path environment.

31 Claims, 19 Drawing Sheets

U.S. PATENT DOCUMENTS

2001/0010689 A1     8/2001   Awater et al.
2002/0136184 A1*   9/2002   Liang et al. ................. 370/338
2002/0136233 A1*   9/2002   Chen et al. .................. 370/445
2002/0173272 A1*   11/2002   Liang et al. ................... 455/63

* cited by examiner

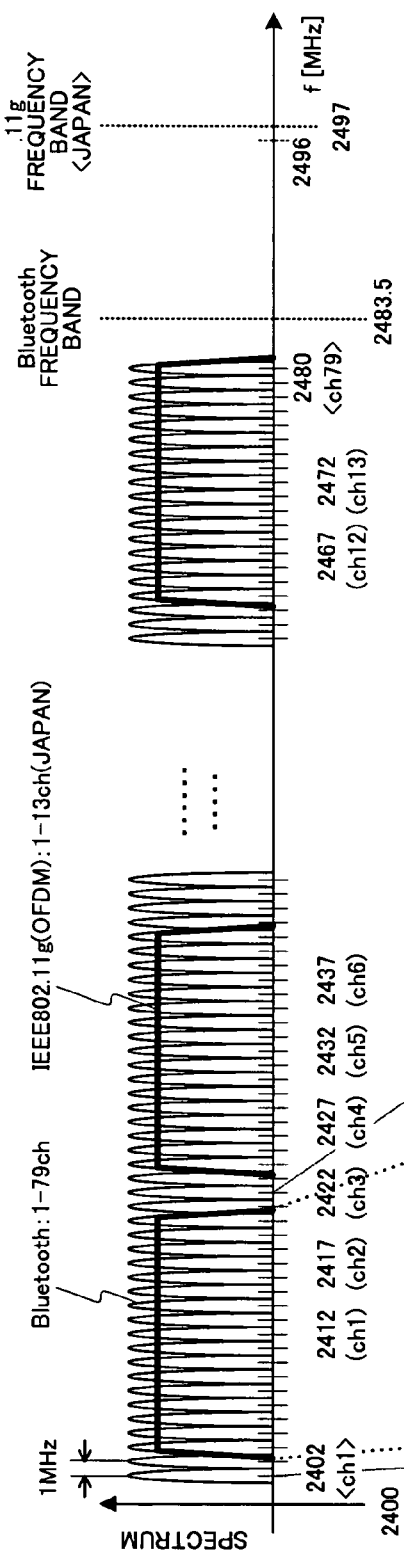
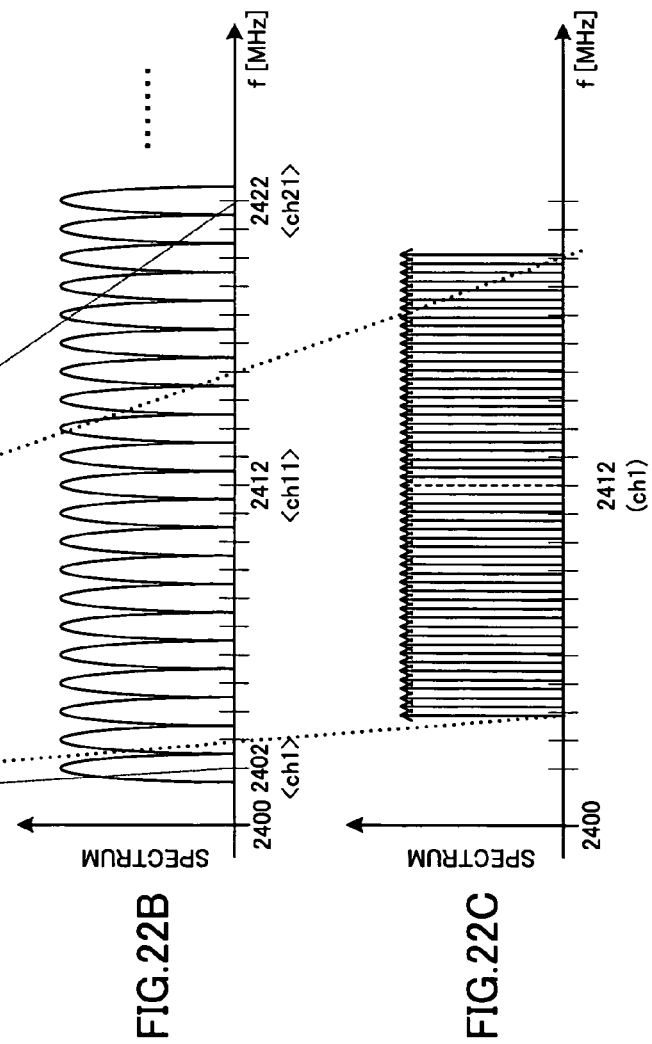
FIG.22A
FIG.22B
FIG.22C

| BIT INPUT | PHASE CHANGE (+jω) |
|---|---|
| 0 | 0 |
| 1 | π |

FIG.34

WIRELESS COMMUNICATION APPARATUS AND COMUNICATION QUALITY ESTIMATING METHOD

TECHNICAL FIELD

The present invention relates to a technology for estimating respective communication qualities of a plurality of wireless communication systems.

BACKGROUND ART

Currently, as wireless communication systems used in communication between a plurality of wireless communication apparatuses in a comparatively small area such as at home and office, wireless LAN (Local Area Network) such as IEEE802.11a, IEEE802.11b, IEEE802.11b and Bluetooth has already been practically implemented. Of these, wireless communication systems complying with standards such as IEEE802.11b, IEEE802.11g and Bluetooth using frequency band of 2.4 GHz that is one of the ISM (Industrial Science Medical) bands requiring no radio license are often used.

Further, adaptive communication technologies for carrying out communication efficiently by carrying out communication while adaptively switching between wireless communication systems according to the communication environment, are studied (for example, refer to Patent Document 1). FIG. 1 shows the conventional wireless communication apparatus carrying out the adaptive communication disclosed in Patent Document 1. In FIG. 1, wireless communication apparatus 3000 has IEEE802.11b wireless section 3001, Bluetooth wireless section 3002 and control section 3003, and control section 3003 carries out communication by switching between wireless sections so as to support two types of wireless communication systems, a wireless communication system complying with IEEE802.11b and a wireless communication system complying with Bluetooth, according to the communication environment.

With this kind of adaptive communication technology, a criterion for appropriate switching of wireless communication systems is material, and an estimation value of communication quality is generally used as this criterion. Regarding the estimation method of the communication quality, when communication is carried out using a wireless communication system complying with IEEE802.11b, in the conventional method disclosed in Patent Document 1, the communication quality for IEEE802.11b is estimated by detecting errors in IEEE802.11b or checking the power of the received signal using the received signal of IEEE802.11b. When this communication quality for IEEE802.11b deteriorates, communication is carried out by switching the wireless communication system to Bluetooth that is comparatively robust with respect to radio interference.

Further, when communication is carried out using Bluetooth, a receiving system of IEEE802.11b is also made to simultaneously operate periodically, and communication quality for IEEE802.11b is estimated by detecting errors in IEEE802.11b or checking the power of the received signal using the received signal for IEEE802.11b. When this communication quality for IEEE802.11b is good, communication is carried out by switching the wireless communication system to IEEE802.11b with a larger communication capacity.

Patent Document 1: Japanese Patent Application Laid-Open No. 2003-199160.

DISCLOSURE OF INVENTION

Problems to be Solved by the Invention

However, with the conventional configuration, when communication is carried out using IEEE802.11b, switching of wireless communication systems is determined using the communication quality of the wireless communication system currently carrying out communication, and therefore the communication quality for the case of carrying out communication using a wireless communication system to be switched to (in this case, Bluetooth) is not known. Because of this, sufficient communication quality may not be obtained after switching, and therefore a case of returning to the original wireless communication system again after switching can be considered. In this case, when time is wasted due to time for connecting after switching to each wireless communication system or due to time for switching hardware, or the wireless communication apparatus is compatible with a plurality of wireless communication systems as a result of rewriting of a reconfigurable processor, there is a problem that overhead such as for time for the rewriting increases, and efficiency deteriorates.

Further, when communication is carried out using Bluetooth, two receiving systems, a receiving system of the current wireless communication system and a receiving system of the wireless communication system to be switched to (in this case, IEEE802.11b) are made to operate simultaneously, and determination is performed as to whether or not to carry out switching using communication quality for the case of communication using the wireless communication system to be switched to, and therefore, there is a problem that power consumption increases compared to the case where only the receiving system of a single system currently carrying out communication is made to operate. Further, when the wireless communication systems in the same frequency band are switched, there is a problem that mutual interference occurs and communication quality cannot be accurately estimated.

It is therefore an object of the present invention to provide a wireless communication apparatus and communication quality estimation method capable of efficiently and appropriately estimating communication quality for the case of carrying out communication using a wireless communication system to be switched to based on a received signal for a wireless communication system currently carrying out communication.

Means for Solving the Problem

In the present invention, under a communication environment of carrying out communication between a first wireless communication apparatus and a second wireless communication apparatus while switching between a plurality of types of wireless communication systems using the same frequency band, the first wireless communication apparatus estimates communication quality in a pseudo manner for the case of carrying out communication using the second wireless communication system under the same wireless communication path environment based on a known signal received from the second wireless communication apparatus using the first wireless communication system, by comparing a frequency characteristic of a received signal of a known signal with a frequency characteristic of a reference signal.

Advantageous Effect of the Invention

According to the present invention, it is possible to estimate communication quality for the case of communication using a wireless communication system to be switched to based on a received signal of a wireless communication system currently carrying out communication without switching the wireless communication system currently carrying out communication. Further, it is possible to estimate communication quality for the case of communication using a wireless communication system to be switched to using a receiving system of a single system without making receiving systems of two systems, the wireless communication system currently carrying out communication and the wireless communication system to be switched to, operate simultaneously.

BRIEF DESCRIPTION OF THE DRAWINGS

FIG. 22 shows the relationship of frequency channels used in the Bluetooth specification and the IEEE802.11g standard;

FIG. 31 shows a real section of a DBPSK modulation signal of a PLCP preamble portion in the IEEE802.11b standard;

FIG. 32 shows an example of extracting signal series from the PLCP preamble portion in the IEEE802.11b standard taking into consideration a guard interval of the IEEE802.11g standard of Embodiment 5;

FIG. 33 shows another example of extracting signal series from the PLCP preamble portion in the IEEE802.11b standard taking into consideration a guard interval of the IEEE802.11g standard of Embodiment 5; and FIG. 34 shows the content of a DBPSK modulation conversion table in the IEEE802.11b standard.

BEST MODE FOR CARRYING OUT THE INVENTION

Embodiments of the present invention will be described below in detail with reference to the accompanying drawings.

Embodiment 1

Figure 1:
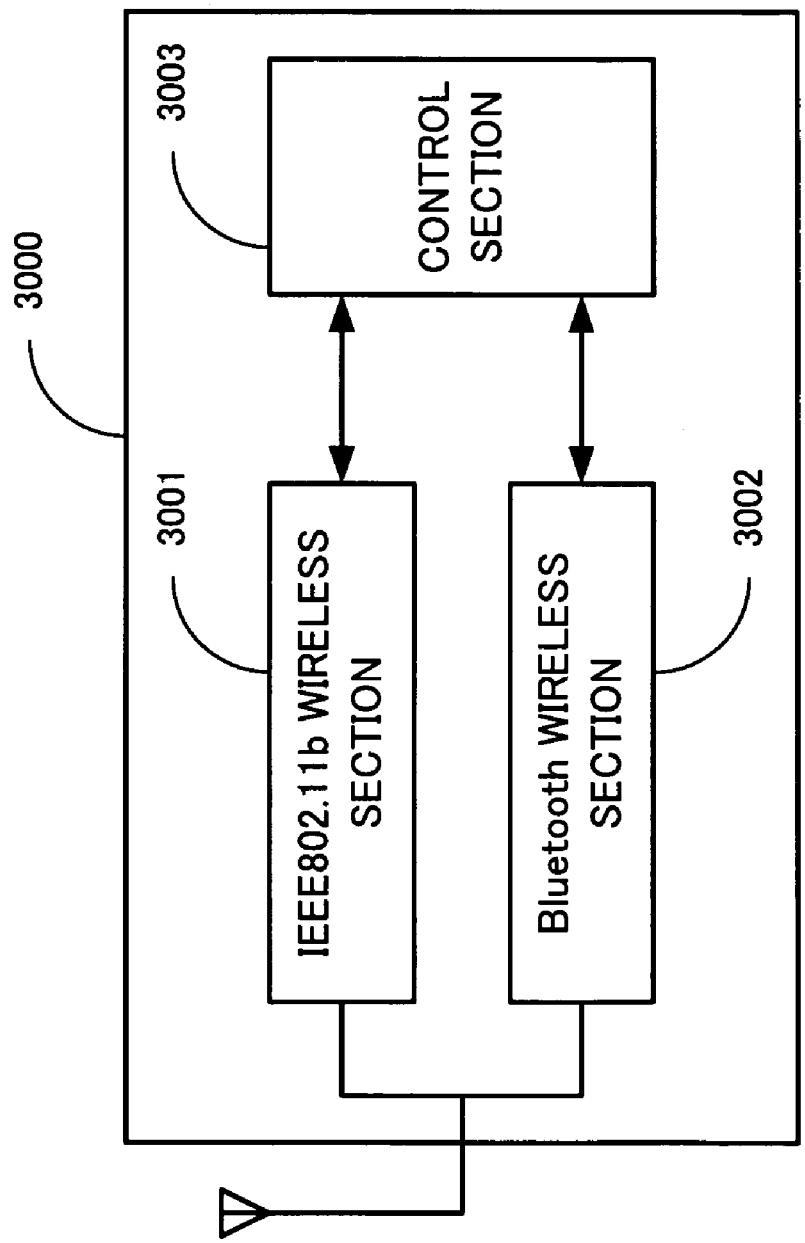
FIG. 1 is a block diagram showing an apparatus configuration of the conventional wireless communication apparatus carrying out adaptive communication.
Figure 2:
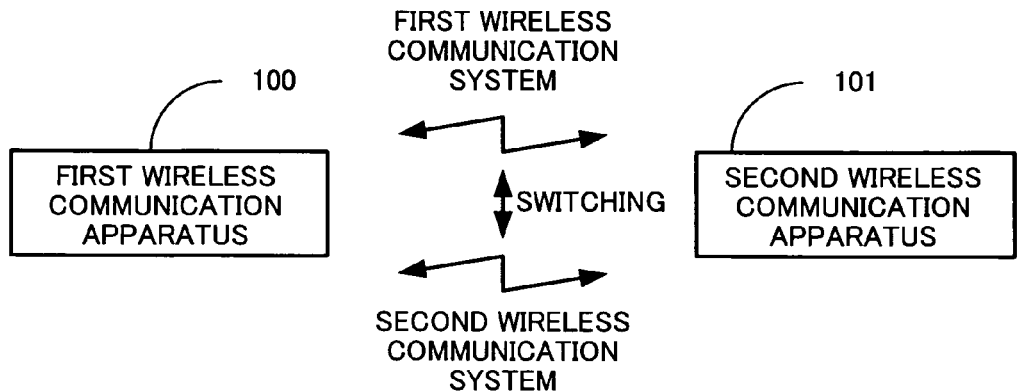
FIG. 2 is a block diagram showing an example of a communication environment of Embodiment 1 of the present invention.

In this embodiment, the configuration and operation will be described where, under a communication environment where communication is carried out while switching between a plurality of types of wireless communication systems using the same frequency band between first wireless communication apparatus 100 and second wireless communication apparatus 101 as shown in FIG. 2, first wireless communication apparatus 100 estimates communication quality in a pseudo manner for the case of communication using a second wireless communication system under the same wireless transmission path environment based on a known signal received from second wireless communication apparatus 101 using a first wireless communication system. Here, a case will be described as an example where the first wireless communication system is a wireless communication system complying with a DSSS (Direct Sequence Spread Spectrum) scheme in the IEEE802.11b standard, and the second wireless communication system is a wireless communication system complying with the OFDM (Orthogonal Frequency Division Multiplex) scheme in the IEEE802.11g standard. Further, in this embodiment, a case will be described where a reception CNR value is obtained for each subcarrier frequency band of the OFDM scheme in the IEEE802.11g standard as communication quality.

In FIG. 2, first wireless communication apparatus 100 is capable of communicating with second wireless communication apparatus 101 using the first wireless communication system and the second wireless communication system, and communicates with second wireless communication apparatus 101 while switching between the first wireless communication system and the second wireless communication system. Further, first wireless communication apparatus 100 estimates communication quality in a pseudo manner for the case of communication using the second wireless communication system under the same wireless transmission path environment based on a known signal received from second wireless communication apparatus 101 during communication with second wireless communication apparatus 101 using the first wireless communication system.

Second wireless communication apparatus 101 is capable of communicating with first wireless communication apparatus 100 using the first wireless communication system and the second wireless communication system, and communicates with first wireless communication apparatus 100 while switching between the first wireless communication system and the second wireless communication system.

Figure 3:
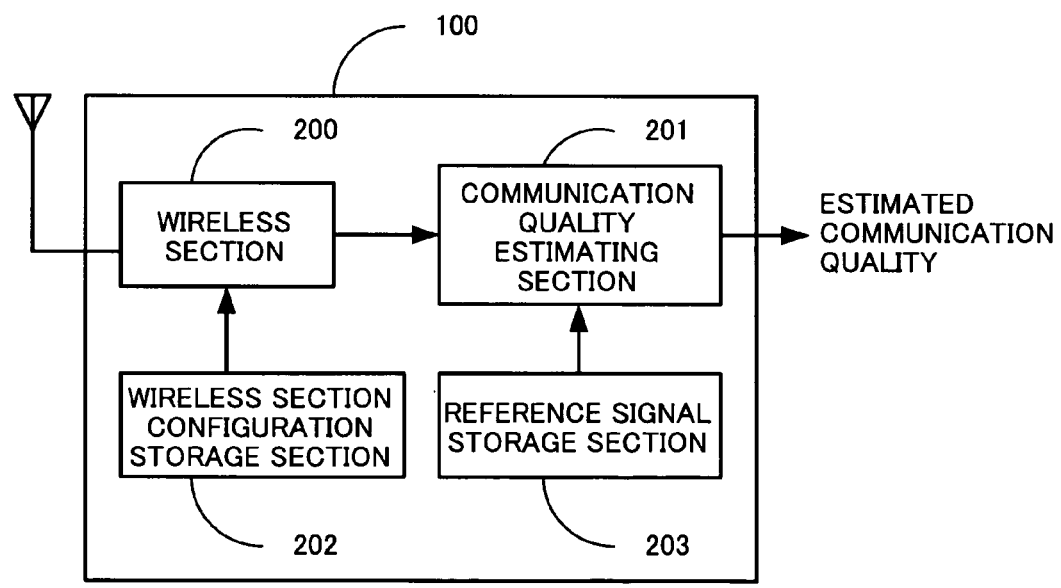
FIG. 3 is a block diagram showing a configuration example of a first wireless communication apparatus of Embodiment 1.

FIG. 3 shows a configuration example of first wireless communication apparatus 100 of this embodiment. First wireless communication apparatus 100 has wireless section 200, communication quality estimating section 201, wireless section configuration storage section 202 and reference signal storage section 203.

Wireless section 200 has an antenna capable of supporting at least the first wireless communication system and the second wireless communication system, and a reconfigurable processing section where functions can be changed. The reconfigurable processing section is configured with a programmable device that is reconfigurable by, for example, re-writing of software. The reconfigurable processing section may be configured with a single device or a combination of devices such as, for example, a FPGA (Field Programmable Gate Array), DSP (Digital Signal Processor), CPU (Central Processing Unit) or reconfigurable processor where functions and operations can be changed by reading of software programs or configuration data. As a result, communication with second wireless communication apparatus 101 is possible while switching between the first wireless communication system and the second wireless communication system using a single wireless section. Further, wireless section 200 transmits a received signal to communication quality estimating section 201.

After carrying out conversion processing specific to the second wireless communication system, on an known signal portion of a received signal outputted from wireless section 200 and received using the first wireless communication system from second wireless communication apparatus 101, and on a reference signal outputted from reference signal storage section 203, communication quality estimating section 201 estimates the communication quality for the case of communication using the second wireless communication system under the same wireless transmission path environment by comparing these, and outputs the estimation result.

Figure 5:
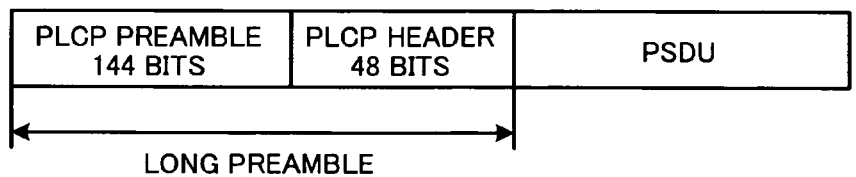
FIG. 5 shows a configuration of a PPDU frame format of IEEE802.11b.

Here, the known signal portion is a signal portion where the content and position of the signal is already known on the transmission side and the receiving side, and a preamble portion or a portion of a pilot signal inserted within the communication packet can be generally applied. As an example of the known signal portion in this embodiment, a PLCP preamble portion in the PPDU frame format of IEEE802.11b is used. FIG. 5 shows a PPDU frame format of IEEE802.11b. Further, a reference signal is a signal where a known signal portion of a transmission signal by the first wireless communication system is stored in advance on the receiving side as a time domain signal.

Wireless section configuration storage section 202 stores information necessary for reconfiguration of wireless section 200.

Reference signal storage section 203 stores in advance a known signal for use in estimation of communication quality as a reference signal. In this embodiment, a PLCP preamble portion in the PPDU frame format of IEEE802.11b is stored in a time domain signal as a reference signal.

Figure 4:
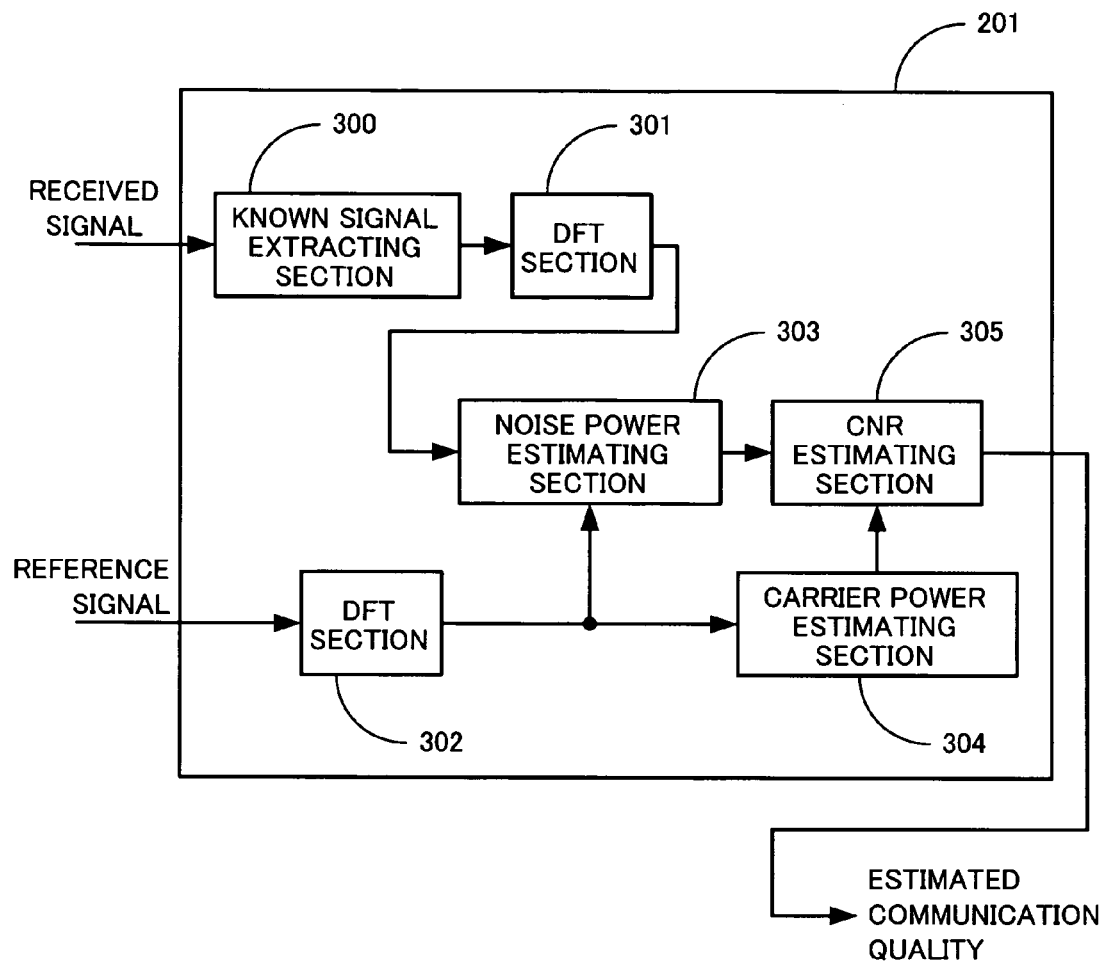
FIG. 4 is a block diagram showing a configuration example of a communication quality estimating section of Embodiment 1.

FIG. 4 shows a configuration example of communication quality estimating section 201 of this embodiment. Communication quality estimating section 201 has known signal extracting section 300, DFT section 301, DFT section 302, noise power estimating section 303, carrier power estimating section 304 and CNR (ratio of carrier power to noise power) estimating section 305.

Known signal extracting section 300 extracts a known signal portion from the received signal, and outputs this signal to DFT section 301 as a received known signal. In this embodiment, a PLCP preamble portion in the PPDU frame format of IEEE802.11b is outputted as the received known signal using the time domain signal.

DFT section 301 converts the received known signal outputted from known signal extracting section 300 from a time domain to a frequency domain by carrying out DFT (Discrete Fourier Transform) processing. As a result, the frequency characteristic of the received known signal is obtained, and this frequency characteristic is outputted to noise power estimating section 303.

DFT section 302 converts the reference signal outputted from reference signal storage section 203 from a time domain to a frequency domain by carrying discrete Fourier transform processing as with DFT section 301. As a result, the frequency characteristic of the reference signal is obtained, and this frequency characteristic is outputted to noise power estimating section 303 and carrier power estimating section 304.

In this embodiment, as an example, it is assumed that DFT section 301 and DFT section 302 carry out 1024 point FFT (Fast Fourier Transform) processing.

Noise power estimating section 303 extracts the noise component for each frequency of the received signal by comparing the frequency characteristic of the received known signal outputted from DFT section 301 with the frequency characteristic of the reference signal outputted from DFT section 302, estimates the power of the noise component of each frequency and outputs this noise power to CNR estimating section 305. To be more specific, noise power estimating section 303 obtains a distance between signal points for each element of input vectors of both, calculates the square of the distance between signal points for each element, and outputs the calculation result.

Carrier power estimating section 304 estimates carrier power at each frequency from the frequency characteristic of the reference signal outputted from DFT section 302, and outputs this carrier power to CNR estimating section 305.

CNR estimating section 305 outputs an estimation value of a received CNR value for each subcarrier frequency band of the OFDM signal in the IEEE802.11g standard from power of the noise component outputted from noise power estimating section 303 and carrier power outputted from carrier power estimating section 304.

Here, it is assumed that a center frequency of the used frequency band of IEEE802.11b and a center frequency of the used frequency band of IEEE802.11g are the same, and the frequency bandwidth of the signal of IEEE802.11b is 11 MHz. Further, it is assumed that the frequency bandwidth of the signal of IEEE802.11g is 16.5625 MHz.

With the above configuration, a specific operation will be described where first wireless communication apparatus 100 capable of carrying out communication while switching between the first wireless communication system complying with the IEEE802.11b standard and the second wireless communication system complying with the IEEE802.11g standard using the same frequency band estimates communication quality for the case of communication using the second wireless communication system under the same wireless transmission path environment based on a received signal of communication using the first wireless communication system from second wireless communication apparatus 101.

First, first wireless communication apparatus 100 receives a signal transmitted according to the IEEE802.11b standard from second wireless communication apparatus 101 at wireless section 200. Wireless section 200 then carries out normal IEEE802.11b reception processing on this received signal, obtains demodulation data, and outputs a baseband signal to communication quality estimating section 201. A configuration is also possible where a baseband signal is formed by subjecting the received signal to amplitude compensation and phase compensation in order to adjust the amplitude and phase of the received known signal and reference signal upon estimation of communication quality. This specific amplitude compensation and phase compensation method is not particularly limited, but, for example, by comparing the received known signal and reference signal and extracting amplitude fluctuation and phase fluctuation of the received known signal, it is possible to implement phase compensation and amplitude compensation processing using the amount of this amplitude fluctuation and phase fluctuation.

First, at known signal extracting section 300, communication quality estimating section 201 extracts a signal of the PLCP preamble portion of IEEE802.11b from the baseband signal of the received signal outputted from wireless section 200 and outputs the extracted signal portion to DFT section 301 as a received known signal.

DFT section 301 then subjects the received known signal outputted from known signal extracting section 300 to DFT processing and obtains the frequency characteristic. To be more specific, the received known signal is subjected to 1024 point FFT processing. As a result, as shown in the following equation, the frequency characteristic of a received known signal made up of complex vectors of a total of 1024 elements for each approximately 10.74 kHz within frequency band of 11 MHz is obtained.

$$\frac{11 \text{ MHz}}{1024} \approx 10.74 \quad (1)$$

Figure 6:
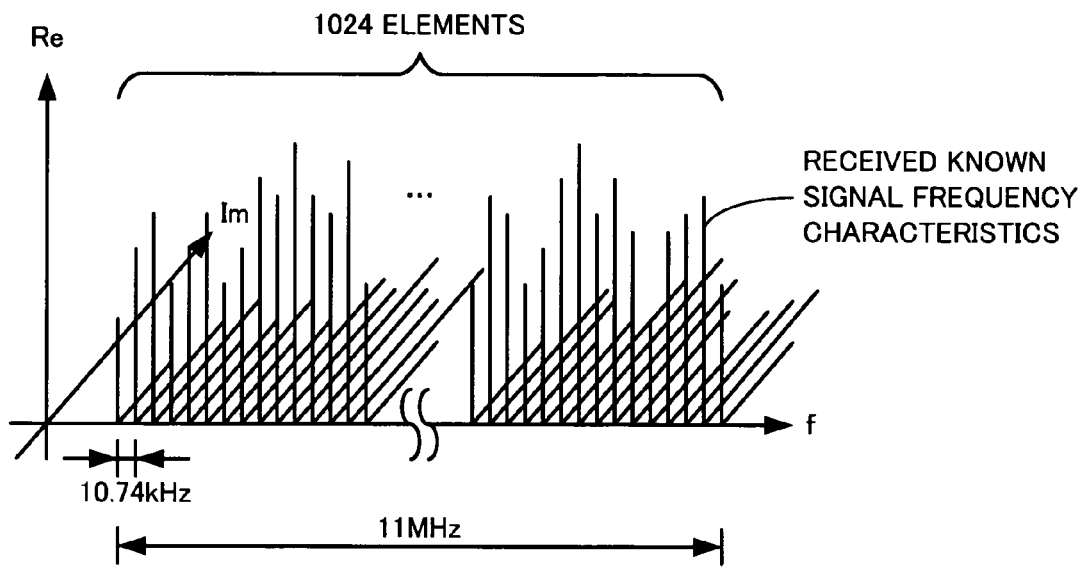
FIG. 6 shows an example of a frequency characteristic of a received known signal of Embodiment 1.

FIG. 6 shows an example of this frequency characteristic. As shown in FIG. 6, a frequency characteristic of the received known signal made up of complex vectors of 1024 elements within frequency band of 11 MHz is obtained. DFT section 301 then outputs the frequency characteristic of the received known signal obtained in this way to noise power estimating section 303.

The time domain signal for the PLCP preamble portion out of the transmission signals in the IEEE802.11b standard is stored in advance as a reference signal in reference signal storage section 203. DFT section 302 obtains the frequency characteristic of the reference signal made up of complex vectors of a total of 1024 elements for each approximately 10.74 kHz within the frequency band of 11 MHz by subjecting the reference signal stored in reference signal storage section 203 to 1024 point FFT processing as with DFT section 301. DFT section 302 then outputs the frequency characteristic of the reference signal obtained in this way to noise power estimating section 303 and carrier power estimating section 304.

Noise power estimating section 303 extracts the noise component for each frequency of the received signal by comparing the frequency characteristic of the received known signal outputted from DFT section 301 and the frequency characteristic of the reference signal outputted from DFT section 302, estimates power of the noise component in each frequency, obtains power of the noise component for each subcarrier frequency band of the OFDM signal in the IEEE802.11g standard, and outputs the result to CNR estimating section 305. The method for estimating power of the noise component is by no means limited, but, as an example, a method for estimating power of the noise component from a distance between signal points on a complex plane of a frequency characteristic of a received known signal and a frequency characteristic of a reference signal.

Figure 7:
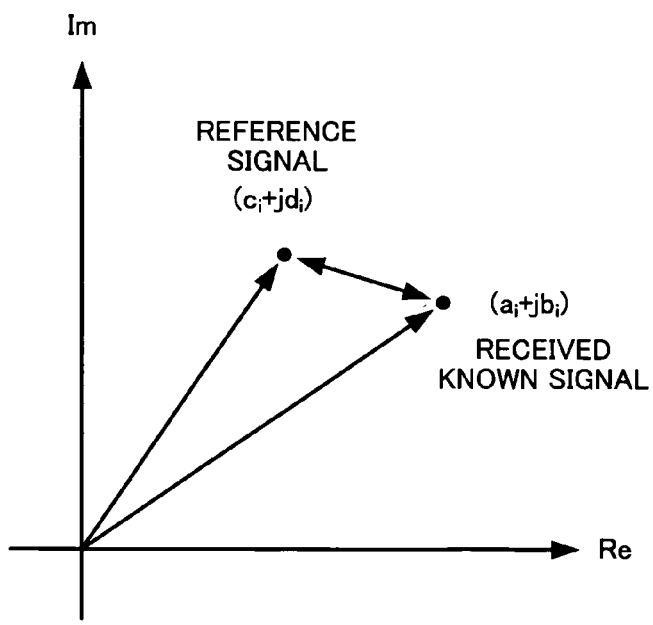
FIG. 7 shows a received known signal and a single frequency component of a frequency characteristic of a reference signal plotted on a complex plane of Embodiment 1.

FIG. 7 shows a frequency characteristic of a received known signal and a frequency characteristic of a reference signal plotted on a complex plane for a given single frequency component out of frequency components of the 1024 elements. In FIG. 7, power of a complex component can be obtained by calculating a distance between signal points on a complex plane of the frequency characteristic of the received known signal and the frequency characteristic of the reference signal and calculating the square of the distance. It is then possible to obtain the power of the noise component in each frequency by carrying out this processing on each frequency component of the 1024 elements. This processing can be expressed by the following equation, taking the frequency characteristic of the received known signal of ith frequency of the 1024 elements to be $(a_i+jb_i)$ (j: imaginary number), taking the frequency characteristic of the reference signal to be $(c_i+jd_i)$ and taking noise power to be $N_i$.

$$N_i = (a_i - c_i)^2 + (b_i - d_i)^2 \quad (1 \leq i \leq 1024) \quad (2)$$

It is then possible to obtain the power of the noise component for each subcarrier by adding up noise power Ni for each frequency component of the 1024 elements calculated as described above for each segment of the frequency components corresponding to each subcarrier frequency band of the OFDM signal in the IEEE802.11g standard. To be more specific, first, when the frequency bandwidth of single subcarrier of the OFDM signal in the IEEE802.11g standard is 312.5 kHz, thirty-five subcarriers (11 MHz/312.5 kHz=35.2) of the OFDM signal in the IEEE802.11g standard are held within the frequency band of 11 MHz as obtained in the following equation.

$$\frac{11 \text{ MHz}}{312.5 \text{ kHz}} = 35.2 \quad (3)$$

The power of the noise component included in the frequency band for single subcarrier becomes twenty-nine elements or thirty elements from the following equation.

$$\frac{1024}{35.2} \approx 29.09 \qquad (4)$$

Figure 8:
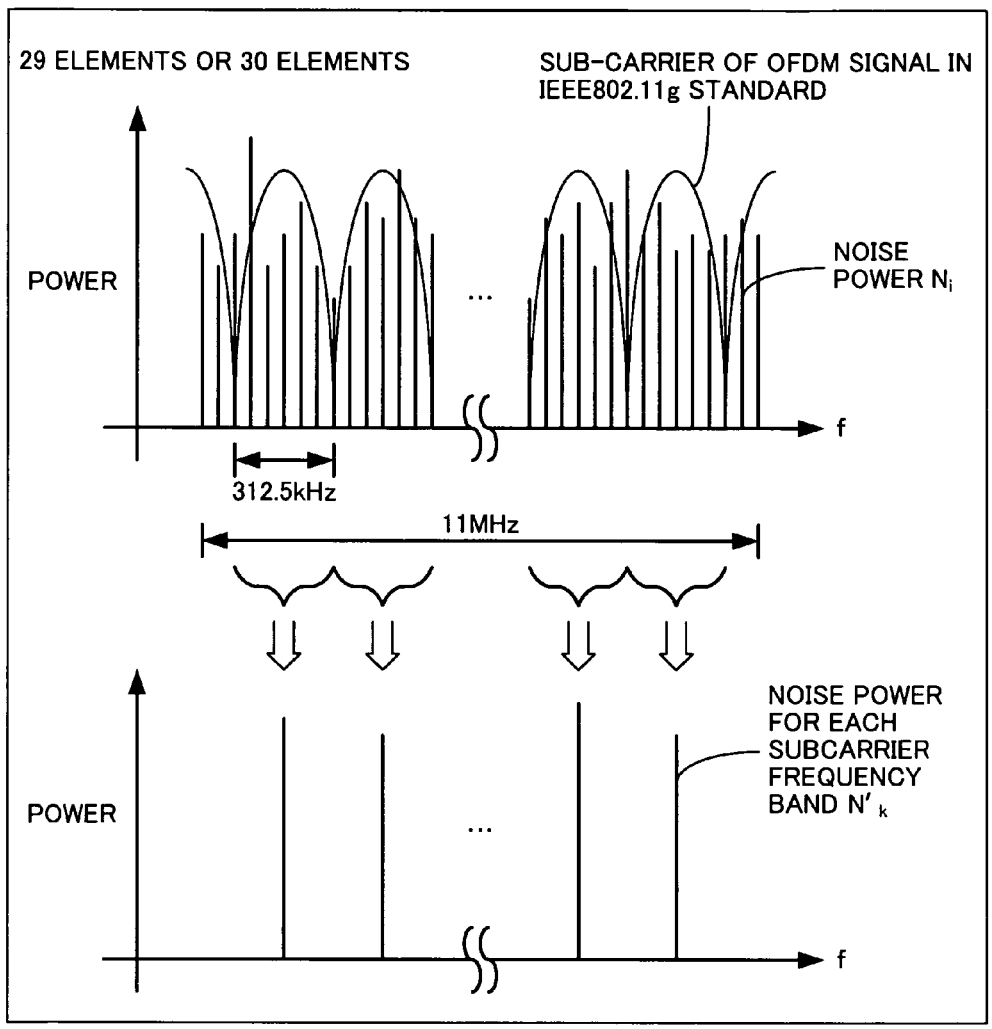
FIG. 8 shows the relationship of a frequency characteristic of noise power and subcarrier frequency band of an OFDM signal of the IEEE802.11g standard of Embodiment 1.

FIG. 8 shows an example view of processing for adding up noise power in each frequency for each subcarrier frequency band of the OFDM signal in the IEEE802.11g standard. As shown in FIG. 8, by adding up 29 elements within each subcarrier frequency band or 30 elements of the noise power elements out of the 1024 elements of noise power as shown in FIG. 8, it is possible to obtain noise power $N'_k$ (where k: kth subcarrier, $1 \leq k \leq 35$) of the frequency bandwidth of approximately 311.5 ($\approx 10.74 \times 29$) kHz substantially corresponding to the frequency bandwidth of a single subcarrier of the OFDM signal or the frequency bandwidth of approximately 322.2 ($\approx 10.74 \times 30$) kHz. Noise power estimating section 303 then outputs noise power $N'_k$ for each subcarrier frequency band obtained in this way to CNR estimating section 305.

Carrier power estimating section 304 calculates carrier power in each frequency by squaring the frequency characteristic of the reference signal outputted from DFT section 302 for each frequency component of the 1024 elements.

When carrier power at the ith frequency is $C_i$, this processing can be expressed by the following equation.

$$C_i = c_i^2 + d_i^2 \quad (1 \leq i \leq 1024) \qquad (5)$$

It is possible to obtain carrier power $C'_k$ (where k: kth subcarrier $1 \leq k \leq 35$) for each subcarrier frequency band by adding up the elements of carrier power of 29 elements or 30 elements within each subcarrier frequency band of the OFDM signal in the IEEE802.11g standard as with the case of the noise power using carrier power $C_i$ for each frequency component of the 1024 elements obtained as a result of this processing. To be more specific, by adding up 29 elements or 30 elements of carrier power within each subcarrier frequency band, carrier power $C'_k$ of a frequency bandwidth of approximately 311.5 kHz substantially corresponding to the frequency bandwidth of a single subcarrier in the OFDM signal or a frequency bandwidth of approximately 322.2 kHz, is obtained. Carrier power estimating section 304 outputs carrier power $C'_k$ for each subcarrier frequency band obtained in this way to CNR estimating section 305.

CNR estimating section 305 obtains the ratio between carrier power $C'_k$ for each subcarrier frequency band outputted from carrier power estimating section 304 and noise power $N'_k$ for each subcarrier frequency band outputted from noise power estimating section 303, and thereby obtains the received CNR value for each subcarrier frequency band in the OFDM signal. To be more specific, the received CNR value for each subcarrier frequency band in the OFDM signal is obtained by dividing carrier power by noise power between the components of the same subcarrier position for carrier power $C'_k$ for each subcarrier frequency band and noise power $N'_k$ for each subcarrier frequency band. As a result of these processings, it is possible to obtain a received CNR value at subcarrier positions of portions overlapped with the modulation signal frequency band of IEEE802.11b out of the subcarriers in the OFDM signal based on the IEEE802.11g standard.

Figure 9:
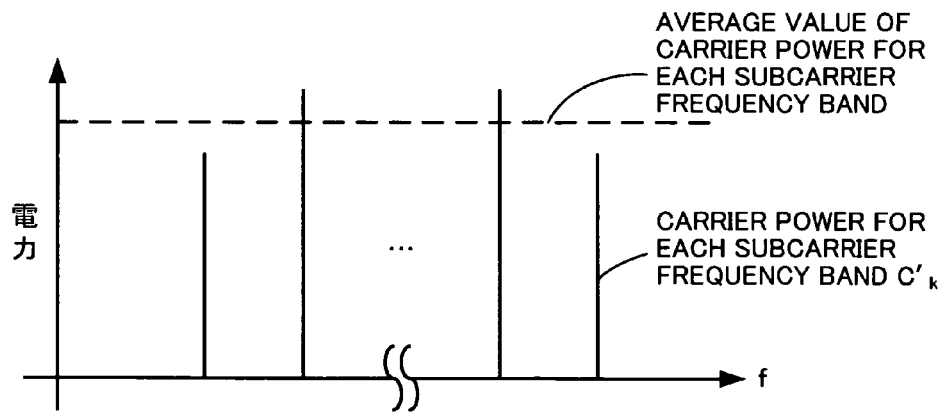
FIG. 9 shows the relationship between carrier power values for each subcarrier frequency band and an average value thereof of Embodiment 1.

When the frequency characteristic of the known signal has a colored characteristic rather than a flat characteristic, the influence of the frequency characteristic of the known signal appears in the estimation result of the received CNR value. Therefore, it can not be determined whether fluctuations of the frequency characteristic of the estimation result is due to the influence of multipaths or noise in the transmission path, or due to the influence of the frequency characteristic of the known signal. In this case, in order to eliminate the influence of the frequency characteristic of the known signal, an estimation value of the received CNR value for each subcarrier frequency band can be obtained by obtaining the average value of the carrier power values for each subcarrier frequency band within the frequency band of 11 MHz and obtaining the ratio between the average value of this carrier power and the noise power for each subcarrier frequency band. FIG. 9 shows the relationship of the carrier power values for each subcarrier frequency band and the average value thereof.

Further, a received CNR value of the subcarrier frequency band of the OFDM signal in the IEEE802.11g standard which is outside of the frequency band of 11 MHz of IEEE802.11b may also be estimated using the estimation value of the received CNR value within the frequency band of 11 MHz calculated as described above. For example, it is possible to perform estimation by performing extrapolation and interpolation processing on a distribution characteristic of the received CNR value for each frequency bandwidth of approximately 10.74 kHz within the modulation signal frequency band of IEEE802.11b calculated as described above.

According to this embodiment, under a communication environment where communication is carried out while switching between a plurality of types of wireless communication systems using the same frequency band between first wireless communication apparatus 100 and second wireless communication apparatus 101, first wireless communication apparatus 100 can estimate in a pseudo manner communication quality for the case of communication using a second wireless communication system under the same wireless transmission path environment based on a signal received from second wireless communication apparatus 101 using the first wireless communication system. Further, by adaptively switching wireless communication systems based on this communication quality, it is also possible to efficiently and appropriately carry out switching of wireless communication systems.

Here, the adaptive switching of the wireless communication systems is by no means limited, but, for example, in the case of switching the wireless communication system from the first wireless communication system to the second wireless communication system, a threshold for the CNR value that is a criterion for the switching of the communication schemes may be decided in advance, and, in the case where an average value of the received CNR values for each subcarrier described above exceeds this threshold or falls below this threshold, the switching of the wireless communication systems may be carried out. Further, it is also possible to adopt a configuration where the number of subcarriers exceeding the CNR value that is a criterion is used as a threshold, and, when the number of subcarriers with the received CNR value exceeding the CNR value of the criterion is larger or smaller than the number of thresholds, the wireless communication systems are switched. In this way, by adaptively switching wireless communication systems based on the above-described communication quality, it is also possible to efficiently and appropriately carry out switching of wireless communication systems.

In the above-described embodiment, a configuration and operation have been described as an example where a received CNR value for each subcarrier frequency band of the OFDM signal in the IEEE802.11g standard is estimated and used as communication quality, but the present invention is by no means limited to this, and other configurations and operations are possible if a configuration is adopted where a characteristic amount in the second wireless communication system is estimated in a pseudo manner using the received signal of portions where the known signal is transmitted out of signals transmitted by the first wireless communication system.

Figure 10:
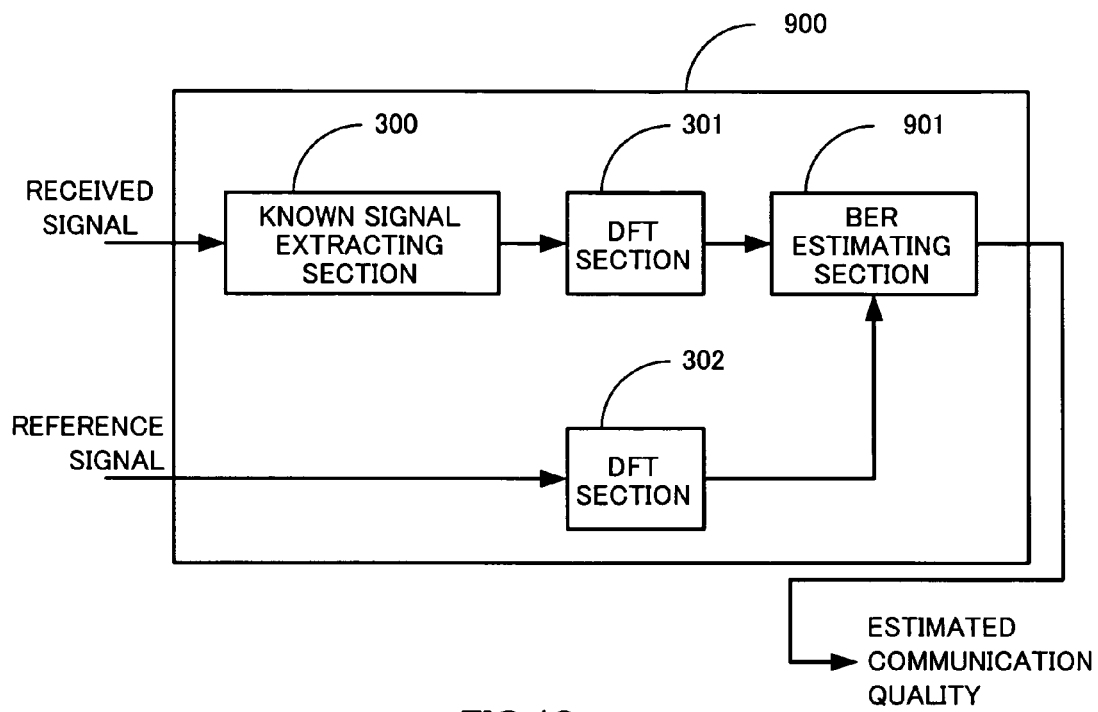
FIG. 10 is a block diagram showing a configuration example of a communication quality estimating section for the case of estimating a BER value of Embodiment 1.

For example, the number of bit errors and bit error rate (BER) in the second wireless communication system can be estimated in a pseudo manner from the following configuration and operation. FIG. 10 shows a configuration of communication quality estimating section 900 for the case of estimating a BER value. In FIG. 10, components in FIG. 10 that are identical with ones in FIG. 4 will be assigned the same numerals without further explanations. BER estimating section 901 estimates in a pseudo manner whether or not bit errors may occur by comparing the frequency characteristic of the received known signal outputted from DFT section 301 and the frequency characteristic of the reference signal outputted from DFT section 302 for each frequency component, estimates the BER value for each subcarrier frequency band of the OFDM signal in the IEEE802.11g standard based on the estimation result, and outputs the estimation result of this BER value as estimated communication quality.

Figure 11:
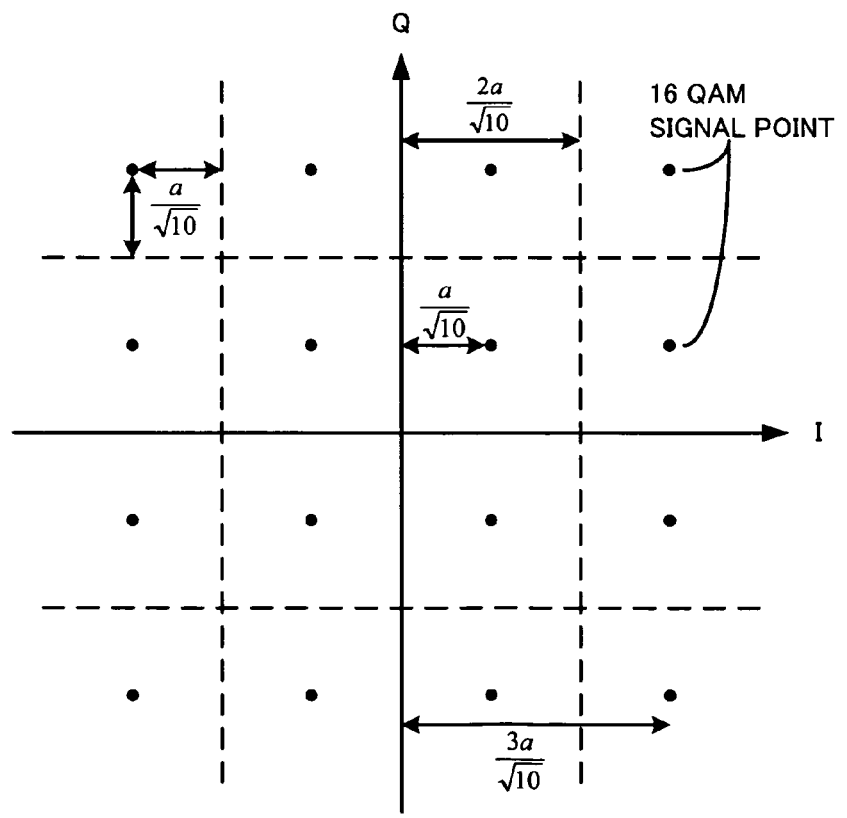
FIG. 11 shows DBPSK and 16 QAM signal point arrangement.

The operation for estimating a BER value using the above configuration will be described below. Here, it is assumed that the OFDM subcarrier portion in the IEEE802.11g standard that is a target of estimation of the BER value is subjected to primary modulation using 16 QAM, as an example. Further, it is assumed that the PLCP preamble portion in the IEEE802.11b standard is subjected to primary modulation using DBPSK. FIG. 11 shows the signal point arrangement for 16 QAM.

First, in the case where the received power is the same for the DBPSK signal (PLCP preamble portion of IEEE802.11b: received known signal) and the 16 QAM signal (sub-carrier portion of IEEE802.11g), when the average value of effective amplitudes at the whole of the frequency component of the frequency characteristic of the received known signal is a, an IQ vector at a frequency domain of the 16 QAM signal can be expressed by ($\pm aM/\sqrt{10}$, $\pm aM/\sqrt{10}$) (M=1, 3), as shown in FIG. 11. Generally, with gray-encoded 16 QAM, by determining whether a sign of I and Q components of an IQ vector for the received signal is positive or negative, two bits out of four bits expressing the signal point are determined, and, by determining the level of the amplitude, the remaining two bits are determined. As shown by the dotted line in FIG. 11, the thresholds upon determination of the amplitude become I=$\pm 2a/\sqrt{10}$, Q=$\pm 2a/\sqrt{10}$, and distances of $a/\sqrt{10}$ are set in the I axis and Q axis from the respective signal points in the 16QAM signal.

Taking this into consideration, thresholds are then set at distances of $a/\sqrt{10}$ to the I axis and Q axis direction, respectively, for the IQ vector for each frequency component of the frequency characteristic of the reference signal outputted from DFT section 302. Threshold determination bit error is then estimated by comparing thresholds set as described above and frequency characteristics of the received known signal outputted from DFT section 301 for the I axis and Q axis respectively for each frequency component.

Figure 12:
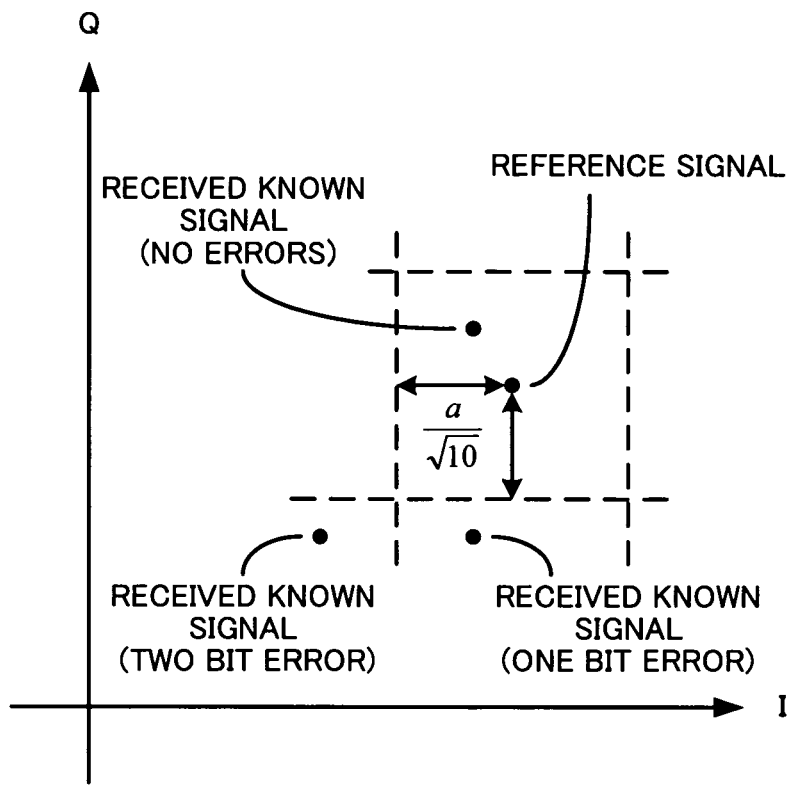
FIG. 12 shows an example of threshold setting and bit error determination for the case of estimating a BER value of Embodiment 1.

FIG. 12 shows threshold setting and determination of threshold determination bit error. As shown in FIG. 12, when a received known signal enters within both thresholds for the I axis and the Q axis provided for the reference signal, it is estimated that the signal of the frequency component will be received without error in the case where communication is carried out using IEEE802.11g. With respect to this, when the received known signal does not enter the region for the threshold of one of the axial directions of the I axis and Q axis, it is estimated that a threshold determination bit error of one bit out of two bits occurs at the signal for this frequency component in the case where communication is carried out using IEEE802.11g. Further, when the received known signal does not enter the region for the threshold of either of the axial directions of the I axis and Q axis, it is estimated that a threshold determination bit error of two bits out of two bits occurs at the signal for this frequency component in the case where communication is carried out using IEEE802.11g.

It is then possible to obtain threshold determination bit error rate $P_{thr}$ for each single subcarrier frequency band by obtaining a rate for each 29 elements or 30 elements within each subcarrier frequency band of the OFDM signal in the IEEE802.11g standard based on a threshold determination bit error result obtained in this way. Namely, the number of threshold determination bit errors may be divided by the number of bits (58 bits or 60 bits) for the 29 elements or 30 elements within each subcarrier frequency band of the OFDM signal in the IEEE802.11g standard.

Amplitude determination bit error rate $P_{amp}$ and sign determination bit error rate $P_{sig}$ are then obtained for each single subcarrier frequency band based on the result of the threshold determination bit error rate obtained in this way. First, regarding the amplitude determination bit error, when only the I axis direction is considered, a gray code is used in 16 QAM, and therefore the amplitude determination bit error occurs in the case where the threshold is exceeded in one of the positive and negative directions, but the amplitude determination bit error does not occur in the case where the threshold is exceeded in the other direction. The same also applies for the Q axis direction, and therefore amplitude determination bit error rate $P_{amp}$ for each single subcarrier frequency band can be expressed by the following equation.

$$P_{amp} = \frac{1}{2} P_{thr} \tag{6}$$

Next, regarding the sign error bits, when only the I axis direction is considered, a sign determination bit error does not occur even if the threshold is exceeded in either a positive direction or a negative direction for two outside points with large absolute values out of the 16 QAM signal points. Further, when the two inside points with small absolute values out of 16 QAM signal points exceed the threshold in one of a positive direction and a negative direction, a sign determination bit error occurs, but, when the threshold is exceeded in the other direction, a sign determination bit error does not occur. The same also applies for the Q axis direction, and therefore sign determination bit error rate $P_{sig}$ for each single subcarrier frequency band can be expressed by the following equation.

$$P_{sig} = \frac{1}{4} P_{thr} \tag{7}$$

Here, when bit error rate for each single subcarrier frequency band is $P_{all}$, it is known that the relationship between $P_{amp}$, $P_{sig}$ and $P_{all}$ can be expressed statistically using the following equation.

$$P_{all} = \frac{1}{2}(P_{amp} + P_{sig}) \quad (8)$$
$$= \frac{1}{2}\left(\frac{1}{2}P_{thr} + \frac{1}{4}P_{thr}\right)$$
$$= \frac{3}{8}P_{thr}$$

It is therefore possible to estimate a BER value for each single subcarrier frequency band by assigning the threshold determination bit error rate for each single subcarrier obtained using the above-described procedure to equation (8).

It is possible to estimate in a pseudo manner a BER value for each subcarrier frequency band in the IEEE802.11g standard using the above configuration and operation.

Further, as a simpler method for estimating a BER value, it is possible to adopt a configuration where the BER value is estimated from the estimation value of the received CNR value for each subcarrier frequency band, and the BER value is used as communication quality. To be more specific, it is possible to estimate a BER value from the estimation value of the received CNR value in each subcarrier frequency band by referring to a table.

In the above-described embodiment, a timing for carrying out estimation has not been described, but estimation may be carried out at a timing appropriate for the system the present invention is applied to, and it is possible to adopt a configuration where, for example, communication quality is always estimated, or a configuration where communication quality is estimated at given fixed intervals. Further, it is possible to adopt a configuration where communication quality of the first wireless communication system currently carrying out communication is also estimated, and, when the communication quality of the current communication falls below a given threshold or exceeds a given threshold, the communication quality for the case of carrying out communication using the second wireless communication system may be estimated as necessary.

In the above-described embodiment, when the frequency characteristic of the known signal has a colored characteristic rather than a flat characteristic, the influence of the frequency characteristic of the known signal is eliminated by obtaining the average value of the carrier power for each subcarrier frequency band within the frequency band of 11 MHz, but this is by no means limiting, and it is also possible to eliminate the influence of the frequency characteristic of the known signal using other methods. For example, it is possible to adopt a configuration where the influence of the frequency characteristic of the known signal is eliminated after obtaining the estimation value of the received CNR value for each subcarrier frequency band.

In the above-described embodiment, the influence of timing synchronization errors upon carrying out normal reception processing of IEEE802.11b at wireless section 200 has not been described, but, when there are timing synchronization errors, it is possible to adopt a configuration of dividing the influence due to noise from the influence due to timing synchronization errors by obtaining moving average in a frequency axis direction for the received signal and eliminating the influence of the timing synchronization errors. Further, it is possible to adopt a configuration of carrying out processing for eliminating the influence of frequency errors from the received signal by carrying out averaging processing in the same way as described above on the frequency synchronization errors.

In the above-described embodiment, a configuration has been described where communication quality estimating section 201, DFT section 301 and DFT section 302 are provided and used to obtain the frequency characteristic of the received known signal and the reference signal, but this is by no means limiting. For example, it is possible to adopt a configuration of obtaining the frequency characteristic of the received known signal and the reference signal using an FFT processing section used originally upon reception of communication complying with the OFDM scheme of the IEEE802.11g standard. In this way, by using functions used in a wireless communication system different from the wireless communication system currently carrying out communication in the estimation of communication quality, it is possible to effectively use the functions of the wireless communication apparatus.

In the above-described embodiment, a case has been described where the center frequency of IEEE802.11b and the center frequency of IEEE802.11g are the same, but this is by no means limiting, and, if there is an overlapped portion between the frequency band of the 11 MHz of IEEE802.11b and the frequency band of IEEE802.11g, it is possible to estimate the received CNR value of the subcarrier frequency band within the overlapped frequency band, and estimate communication quality of the used frequency band of IEEE802.11g by estimating the received CNR value of the subcarrier frequency band outside the overlapped frequency band using the estimation value of the received CNR value.

Further, in the above-described embodiment, it has been assumed that the first wireless communication system is a wireless communication system complying with the DSSS scheme in the IEEE802.11b standard, and the second wireless communication system is a wireless communication system complying with the OFDM scheme in the IEEE802.11g standard, but the present invention is by no means limited to this, and can also be applied to other wireless communication systems if the frequency band used by the first wireless communication system and the frequency band used by the second wireless communication system are partially or completely overlapped. For example, application is also possible taking the first wireless communication system as a wireless communication system complying with the DSSS scheme in the IEEE802.11b standard and taking the second wireless communication system as the wireless communication system complying with the Bluetooth specification. In this case, with regards to the obtaining of the noise power and carrier power for each subcarrier frequency band of the OFDM signal and the obtaining of the received CNR value for each subcarrier frequency band in the OFDM signal in the above-described embodiment, the received CNR value may be obtained for each frequency channel in the Bluetooth specification by obtaining the noise power and carrier power for each frequency channel in the Bluetooth specification and obtaining the ratio of these.

Further, in the above-described embodiment, a case has been described where the center frequency of IEEE802.11b is fixed and estimation is carried out using the estimation value of the received CNR value within the frequency band of 11 MHz for the subcarrier frequency band of outside of the frequency band of 11 MHz, but this is by no means limiting. For example, by carrying out estimation of the received CNR value while changing the center frequency of the IEEE802.11b little by little, it is also possible to estimate the received CNR value of desired frequency band.

In the above-described embodiment, two types of wireless communication systems, a first wireless communication system and a second wireless communication system, are adopted, but this is by no means limiting, and it is also possible to adopt a configuration of using three or more types of wireless communication systems. In this case, by configuring wireless section 200 of the both wireless communication apparatuses and communication quality estimation section 201 of wireless communication apparatus 100 so as to support three or more types of wireless communication systems, estimating communication quality for the case of communication using the other plurality types of wireless communication systems, while carrying out communication using a given wireless communication system, comparing communication quality of the estimated plurality of types, and switching to the most efficient wireless communication system, it is possible to carrying out communication more efficiently.

In the above-described embodiment, a configuration has been described where only first wireless communication apparatus 100 carries out estimation of communication quality, but this is by no means limiting, and it is also possible to adopt a configuration where a communication quality estimating section and reference signal storage section are also provided in second wireless communication apparatus 101, and estimation of communication quality is also carried out at both first wireless communication apparatus 100 and second wireless communication apparatus 101.

Further, in the above-described embodiment, wireless section 200 of first wireless communication apparatus 100 is made to support the first wireless communication system and the second wireless communication system by using a programmable device that is reconfigurable by rewriting of software, but this is by no means limiting, and a configuration is also possible where wireless sections supporting the first wireless communication system and the second wireless communication system are provided independently, and communication is carried out by making the wireless section to be used operate as necessary. Moreover, the configuration is by no means limited to the configuration having a single antenna for a single wireless section, and a configuration is also possible where a plurality of antennas are provided for a single wireless section.

Further, in the above-described embodiment, first wireless communication apparatus 100 is configured with wireless section 200, communication quality estimating section 201, wireless section configuration storage section 202 and reference signal storage section 203, but this is by no means limiting, and in addition to the above-described configuration, an output section outputting a communication quality estimation result to other processing sections or equipments may also be provided. By this means, by outputting the estimation result of communication quality from the output section to external equipments such as a PC, TV and printer, it is possible to share and use the estimation result of communication quality with other equipments, and output the estimation result of communication quality as images and character information.

As a result, it is possible to convey the estimation result of communication quality to a user.

Further, in the above-described embodiment, a configuration has been described where a known signal portion is extracted at known signal extracting section 300 of communication quality estimating section 201 of first wireless communication apparatus 100, but this is by no means limiting, and a configuration is also possible where the known signal portion is extracted at wireless section 200 of first wireless communication apparatus 100, and only the known signal portion is outputted to communication quality estimating section 201.

Moreover, in the above-described embodiment, a configuration has been described where two types of storage sections, wireless section configuration storage section 202 and reference signal storage section 203, are individually provided, but this is by no means limiting, and a configuration is also possible where the two types of storage sections are shared, and both information necessary for the reconfiguration of wireless section 200 and the reference signal are stored in a single storage section.

Further, in the above-described embodiment, 1024 point FFT processing is used upon conversion of the signal from the time domain to the frequency domain, but this is by no means limiting. For example, by increasing the number of points of FFT processing such as, for example, 2048 points and 4096 points, it is possible to minutely estimate the frequency characteristic of noise power and carrier power. Further, by decreasing the number of points such as 512 points and 256 points, it is also possible to reduce the number of processing calculations. Moreover, it is also possible to use DFT processing of an arbitrary number of points instead of FFT processing.

In the above-described embodiment, a configuration has been described where different DFT sections are used in DFT processing for the received known signal and DFT processing for the reference signal, but this is by no means limiting, and a configuration is also possible where processing is carried out by a single DFT section by carrying out DFT processing for the received known signal and DFT processing for the reference signal at different times.

Further, in the above-described embodiment, a case has been described where a PLCP preamble portion is used as the known signal portion, but this is by no means limiting, and it is only necessary that this signal be the known signal on the reception side, and a configuration is also possible where a known signal may be embedded in, for example, a PLCP header portion or data portion, and estimation is carried out using this signal. In this way, it is possible to increase the estimation accuracy of the communication quality by increasing the signals used in estimation of the communication quality.

In the above-described embodiment, a case has been described where CNR estimating section 305 is provided and a ratio of carrier power to noise power is obtained, but the present invention is by no means limited in this respect, and a CINR estimating section may also be provided in place of CNR estimating section 305, and communication quality may be estimated in a pseudo manner for each frequency component by obtaining the ratio of carrier power to interference noise power.

Further, in the above-described embodiment, a case has been described where noise power and carrier power are obtained for each subcarrier frequency band of the OFDM signal, and communication quality is estimated in a pseudo manner for each subcarrier frequency band, but this is by no means limited to being for each subcarrier frequency band, and the same results may also be obtained in the case where noise power and carrier power are obtained for each arbitrary frequency band and communication quality is then estimated in a pseudo manner for each frequency band. Namely, implementation that is the same as for the embodiment is possible even if subcarrier frequency band of this embodiment is read as arbitrary frequency band.

Embodiment 2

Figure 13:
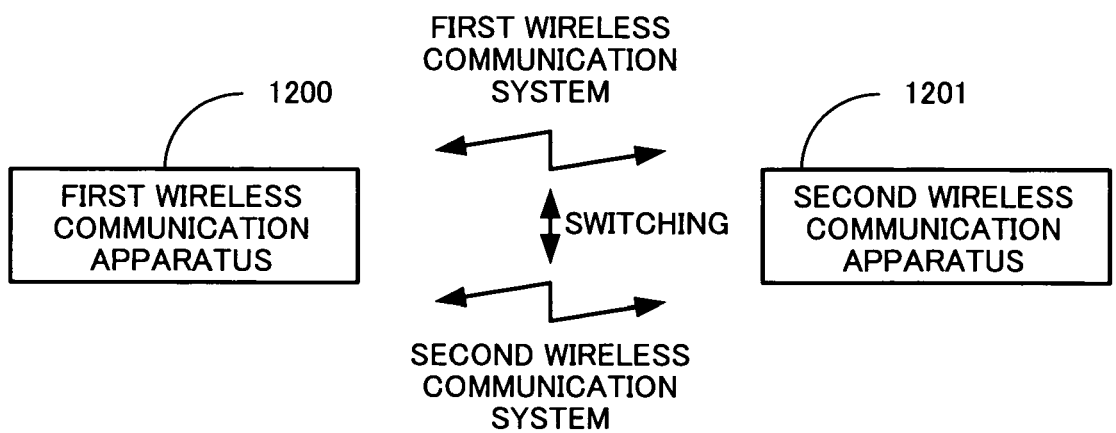
FIG. 13 is a block diagram showing an example of a communication environment of Embodiment 2 of the present invention.

In this embodiment, the configuration and operation will be described for the case of estimating communication quality in a pseudo manner for the case where, under a communication environment where communication is carried out while switching between a plurality of types of wireless communication systems using the same frequency band between first wireless communication apparatus 1200 and second wireless communication apparatus 1201 as shown in FIG. 13, first wireless communication apparatus 1200 estimates communication quality in a pseudo manner for the case of communication using a second wireless communication system under the same wireless transmission path environment based on a known signal received from second wireless communication apparatus 1201 using the first wireless communication system. Here, a case will be described as an example where the first wireless communication system is assumed as a wireless communication system complying with a ERP-OFDM scheme in the IEEE802.11g standard, and the second wireless communication system is assumed as a wireless communication system complying with the DSSS scheme in the IEEE802.11b standard.

In FIG. 13, first wireless communication apparatus 1200 is capable of communicating with second wireless communication apparatus 1201 using the first wireless communication system and the second wireless communication system, and communicates with second wireless communication apparatus 1201 while switching between the first wireless communication system and the second wireless communication system. Further, first wireless communication apparatus 1200 estimates communication quality in a pseudo manner for the case of communication using the second wireless communication system under the same wireless transmission path environment based on a known signal received from second wireless communication apparatus 1201 during communication with second wireless communication apparatus 1201 using the first wireless communication system. Here, it is assumed that a PLCP preamplifier portion of the ERP-OFDM scheme in the IEEE802.11g standard is used as the known signal.

Second wireless communication apparatus 1201 is capable of communicating with first wireless communication apparatus 1200 using the first wireless communication system and the second wireless communication system, and is capable of communicating with first wireless communication apparatus 1200 while switching between the first wireless communication system and the second wireless communication system.

Figure 14:
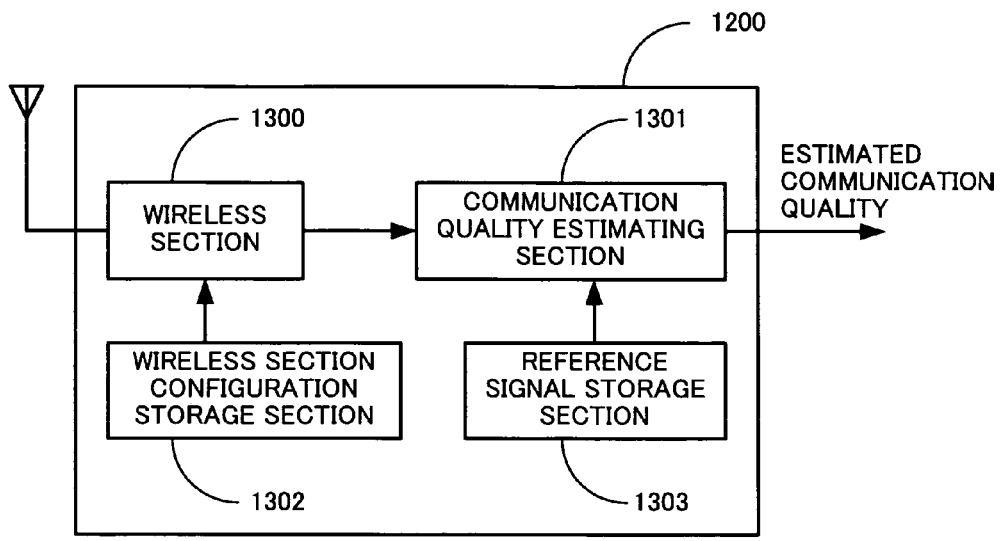
FIG. 14 is a block diagram showing a configuration example of a first wireless communication apparatus of Embodiment 2.

FIG. 14 shows a configuration example of first wireless communication apparatus 1200 of this embodiment. First wireless communication apparatus 1200 has a wireless section 1300, communication quality estimating section 1301, wireless section configuration storage section 1302 and reference signal storage section 1303.

Wireless section 1300 has an antenna capable of supporting at least the first wireless communication system and the second wireless communication system, and a reconfigurable processing section where functions can be changed. The reconfigurable processing section is configured with a programmable device that is reconfigurable by, for example, re-writing of software. The reconfigurable processing section may be configured with a single device or a combination of devices such as, for example, a FPGA (Field Programmable Gate Array) DSP (Digital Signal Processor), CPU (Central Processing Unit), or reconfigurable processor where functions and operations can be changed by reading of software programs or configuration data. As a result, communication with second wireless communication apparatus 1201 is possible while switching between the first wireless communication system and the second wireless communication system using a single wireless section. Further, wireless section 1300 transmits the received signal to communication quality estimating section 1301.

Communication quality estimating section 1301 estimates communication quality for the case of communication using the second wireless communication system under the same wireless transmission path environment using a received signal received from second wireless communication apparatus 1201 outputted from wireless section 1300 using the first wireless communication system and a reference signal outputted from reference signal storage section 1303, and outputs these estimation results as estimated communication quality.

Wireless section configuration storage section 1302 stores information necessary in reconfiguration of wireless section 1300.

Reference signal storage section 1303 already stores a known signal used in estimation of communication quality as a reference signal.

Figure 15:
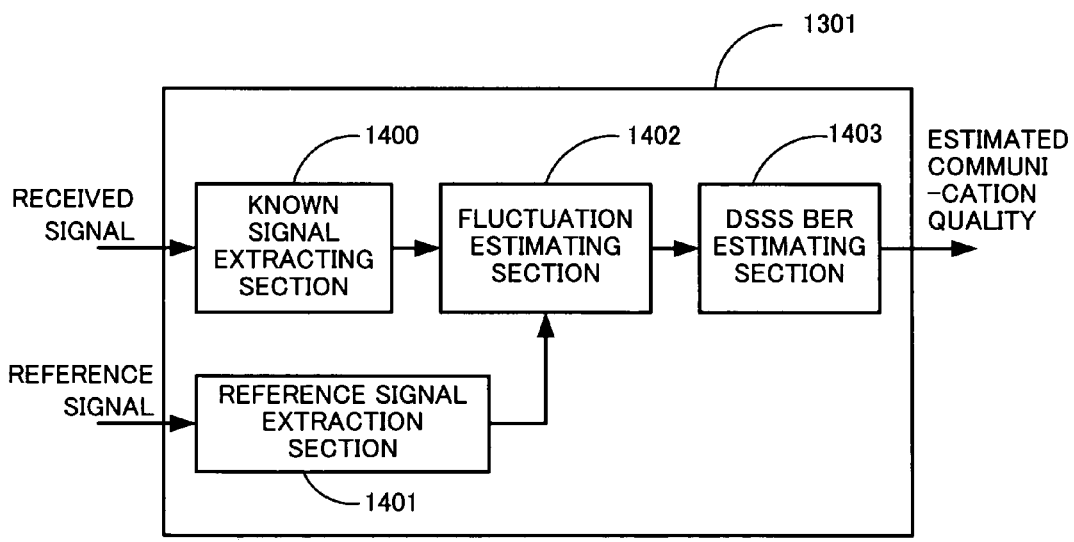
FIG. 15 is a block diagram showing a configuration example of a communication quality estimating section of Embodiment 2.

FIG. 15 shows a configuration example for communication quality estimating section 1301 of this embodiment. Communication quality estimating section 1301 has known signal extracting section 1400, reference signal extracting section 1401, fluctuation estimating section 1402 and DSSS_BER estimating section 1403.

Figure 16:
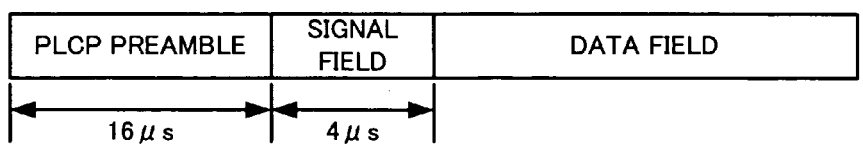
FIG. 16 shows a configuration of a PPDU frame format of an ERP-OFDM scheme of IEEE802.11g.

Known signal extracting section 1400 extracts a known signal portion from the received signal, and outputs this signal to fluctuation estimating section 1402 as a received known signal. The known signal portion is a signal portion for which the content and position of this signal is already known on the receiving side, and can generally be applied to a preamble portion inserted within the communication packet or a portion of a pilot signal. A PLCP preamble portion a PPDU frame format of the ERP-OFDM scheme in the IEEE802.11g is used as an example of a known signal portion in this embodiment. FIG. 16 shows a PPDU frame format of the ERP-OFDM scheme in IEEE802.11g. In this embodiment, a sampling rate for a signal of a PLCP preamble portion of the ERP-OFDM scheme in IEEE802.11g and a sampling rate for a signal of the DSSS scheme in IEEE802.11b are different. Thinning out is therefore carried out so that the sampling rate of the signal after extraction during extraction of the known signal portion is equal to the sampling rate of the signal of the DSSS scheme in IEEE802.11b. The details of this will be described later. Known signal extracting section 1400 outputs the received known signal obtained in this way to fluctuation estimating section 1402.

Reference signal extracting section 1401 then carries out thinning out of the reference signal outputted from reference signal storage section 1303 so that the sampling rate becomes equal to the signal of the DSSS scheme in IEEE802.11b. The reference signal after this thinning out is then outputted to fluctuation estimating section 1402 as a reference signal.

Fluctuation estimating section 1402 obtains a fluctuation vector indicating amplitude fluctuation and phase fluctuation of the received signal using a received known signal outputted from known signal extracting section 1400 and a reference signal outputted from reference signal extracting section 1401, and outputs this fluctuation vector to DSSS_BER estimating section 1403.

DSSS_BER estimating section 1403 then estimates BER for the case of communication using the DSSS scheme in IEEE802.11b using fluctuation vectors outputted from fluctuation estimating section 1402, and outputs the estimation results as estimated communication quality.

Here, in this embodiment, as an example, it is assumed that the used frequency band of the first wireless communication system and the used frequency band of the second wireless communication system are substantially the same.

In the above configuration, a specific operation will be described of estimating communication quality for the case where first wireless communication apparatus 1200 capable of carrying out communication while switching between the first wireless communication system complying with the ERPM-OFDM scheme in the IEEE802.11g standard and the second wireless communication system complying with the DSSS scheme in the IEEE802.11b standard using the same frequency band, performs communication using the second wireless communication system under the same wireless transmission path environment based on a received signal of communication using the first wireless communication system from second wireless communication apparatus 1201.

First, first wireless communication apparatus 1200 receives a signal transmitted according to the ERP-OFDM scheme in the IEEE802.11g standard from second wireless communication apparatus 1201 at wireless section 1300. Wireless section 1300 then acquires demodulation data by carrying out normal reception processing of the ERP-OFDM scheme of IEEE802.11g on this received signal, and outputs a baseband signal to communication quality estimating section 1301.

First, at known signal extracting section 1400, communication quality estimating section 1301 extracts a PLCP preamble portion of the ERP-OFDM scheme in the IEEE802.11g standard from the received signal outputted from wireless section 1300 in accordance with the sampling rate of a signal of the DSSS scheme in IEEE802.11b, and outputs the extracted signal portion to fluctuation estimating section 1402 as a received known signal. This specific operation will be described in the following.

Figure 17:
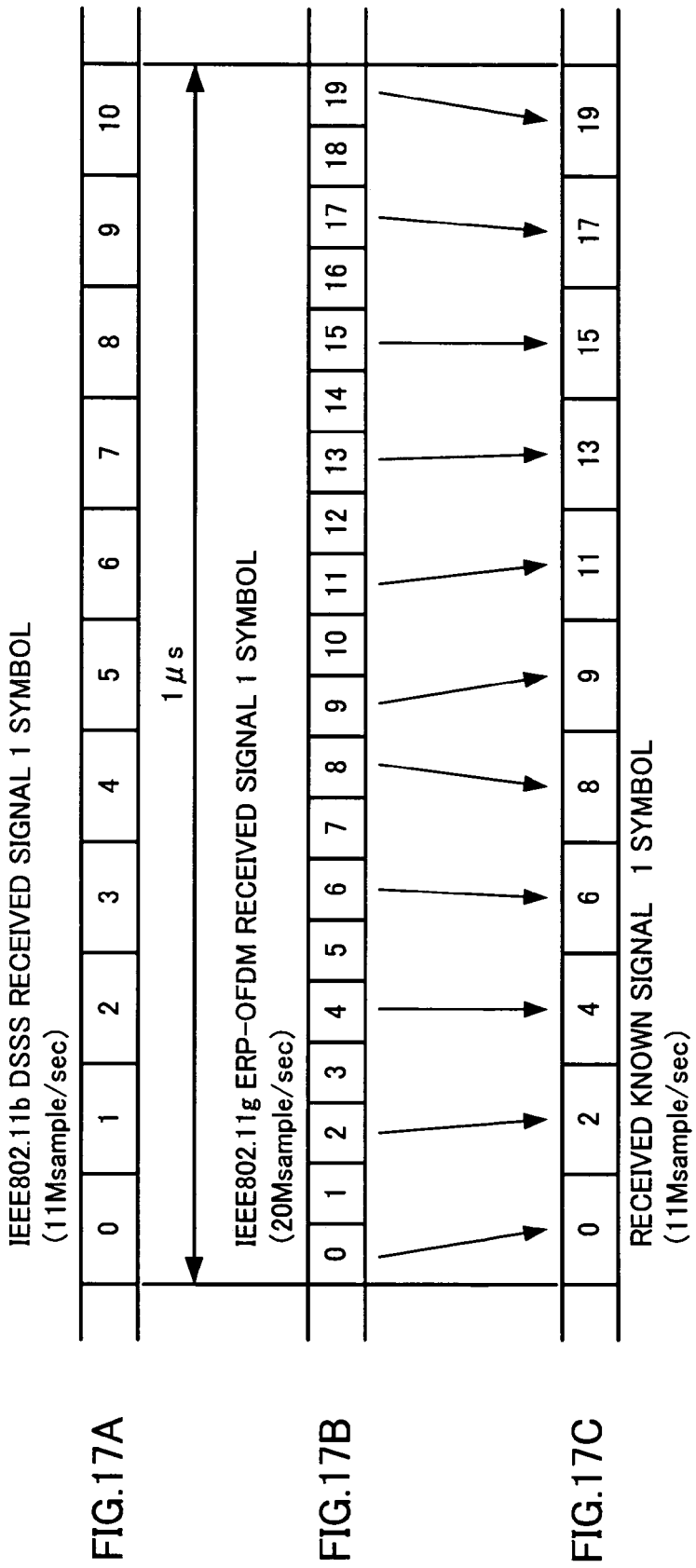
FIG. 17 shows an example of operation of a known signal extracting section of Embodiment 2.

FIG. 17 shows a received signal (FIG. 17A) of the DSSS scheme, a received signal (FIG. 17B) of the ERP-OFDM scheme, and a received known signal (FIG. 17C) extracted from the received signal of the ERP-OFDM scheme in accordance with the sampling rate of the signal of the DSSS scheme. As shown in FIG. 17, the sampling rate in the ERP-OFDM scheme is 20 MHz with respect to the sampling rate in the DSSS scheme of 11 MHz. The signal is therefore thinned out so that the timings become substantially equal, and it is then necessary to extract the received known signal. As an example in this embodiment, 0th, 2nd, 4th, 6th, 8th, 9th, 11th, 13th, 15th, 17th and 19th samples are extracted from twenty samples (0 to 19) within a single symbol for the received signal of the ERP-OFDM scheme of 20 MHz. As a result of doing this, it is possible to generate a received known signal of 11 MHz from the received signal of the ERP-OFDM scheme of 20 MHz. Known signal extracting section 1400 outputs the received known signal generated in this way to fluctuation estimating section 1402.

Further, reference signal extracting section 1401 extracts a reference signal of 11 MHz from a reference signal of the ERP-OFDM signal of 20 MHz using the same procedure as for known signal extracting section 1400. This reference signal is outputted to fluctuation estimating section 1402.

Fluctuation estimating section 1402 then estimates amplitude fluctuation and phase fluctuation for each sample of the received signal using a received known signal outputted from known signal extracting section 1400 and a reference signal outputted from reference signal extracting section 1401. The method for estimating amplitude fluctuation and phase fluctuation of the received signal is by no means limited, but a method for estimating amplitude fluctuation and phase fluctuation per sample by dividing a received known signal vector by a reference signal vector for each sample is described in the following using FIG. 18, as an example.

Figure 18:
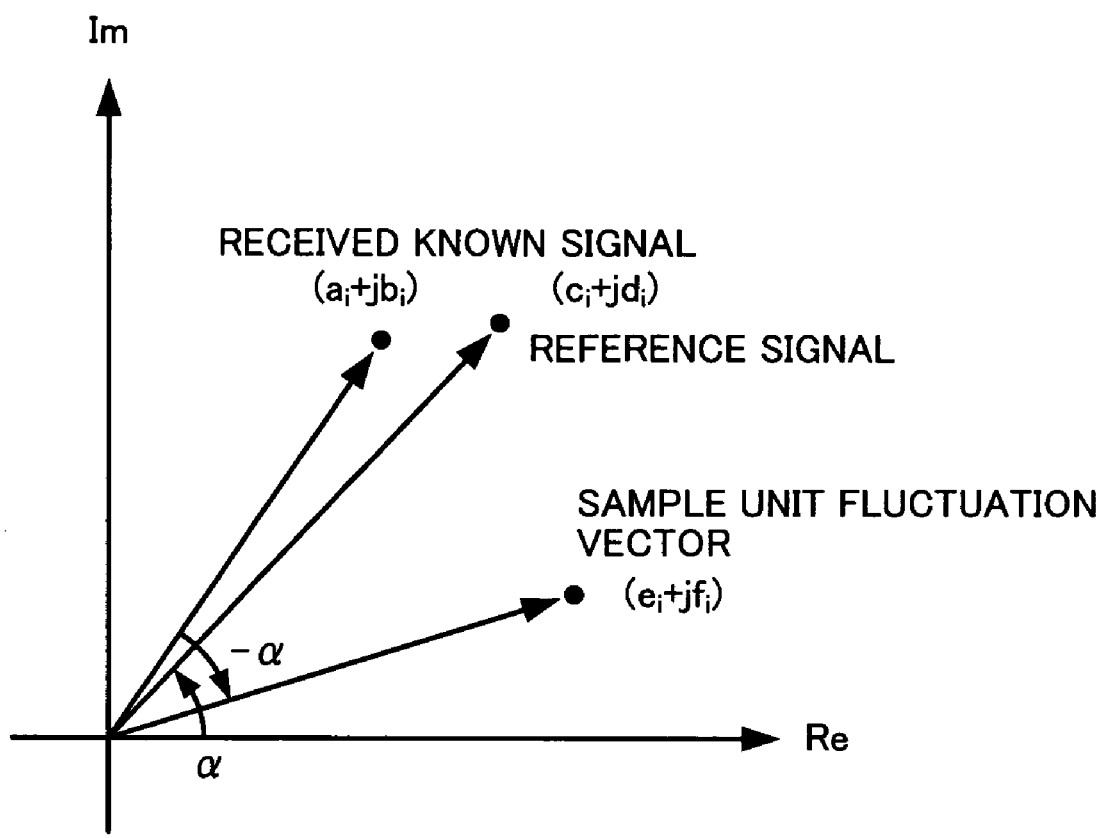
FIG. 18 shows a received known signal vector, reference signal vector and fluctuating vector plotted on a complex plane of Embodiment 2.

FIG. 18 shows a received known signal vector. In this drawing, $(a_i+jb_i)$ indicates the received known signal vector, and a single symbol is configured with 11 symbols, $a_0$ to $a_{10}$. Further, $(c_i+jd_i)$ indicates the reference signal vector, and a single symbol is configured with 11 symbols, $b_0$ to $b_{10}$. A fluctuation vector $(e_i+jf_i)$ per sample is obtained by the following equation for each single sample for these signals, and this fluctuation vector is outputted to DSSS_BER estimating section 1403.

$$e_i + jf_i = (a_i + jb_i) \div \frac{c_i + jd_i}{|c_i + jd_i|} \qquad (9)$$

DSSS_BER estimating section 1403 estimates whether or not an error occurs for each symbol in the case of communication using the DSSS scheme of the IEEE802.11b standard under the same wireless transmission path environment using fluctuation vectors outputted from fluctuation estimating section 1402 and outputs these results as estimation communication quality. Here, the bit error rate (BER: Bit Error Rate) is obtained as communication quality in this embodiment. A specific description will be given below using FIG. 19. First, at DSSS_BER estimating section 1403, fluctuation vector G ($=g+jh$) per symbol is estimated by obtaining the sum of one symbol segment (eleven samples) of a fluctuation vector per sample outputted from fluctuation estimating section 1402 using the following equation.

$$G = g + jh = \sum_{i=0}^{10} (e_i + jf_i) \qquad (10)$$

Figure 19A:
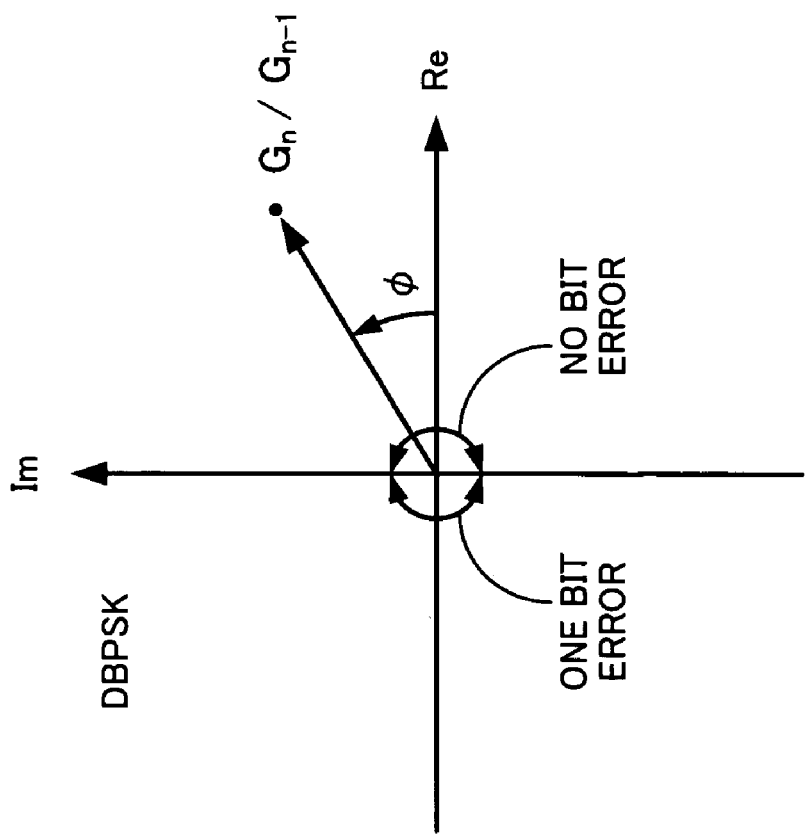
FIG. 19 shows an example of a scale of a phase difference and bit error determination for the case of estimating a BER value of Embodiment 2.
Figure 19B:
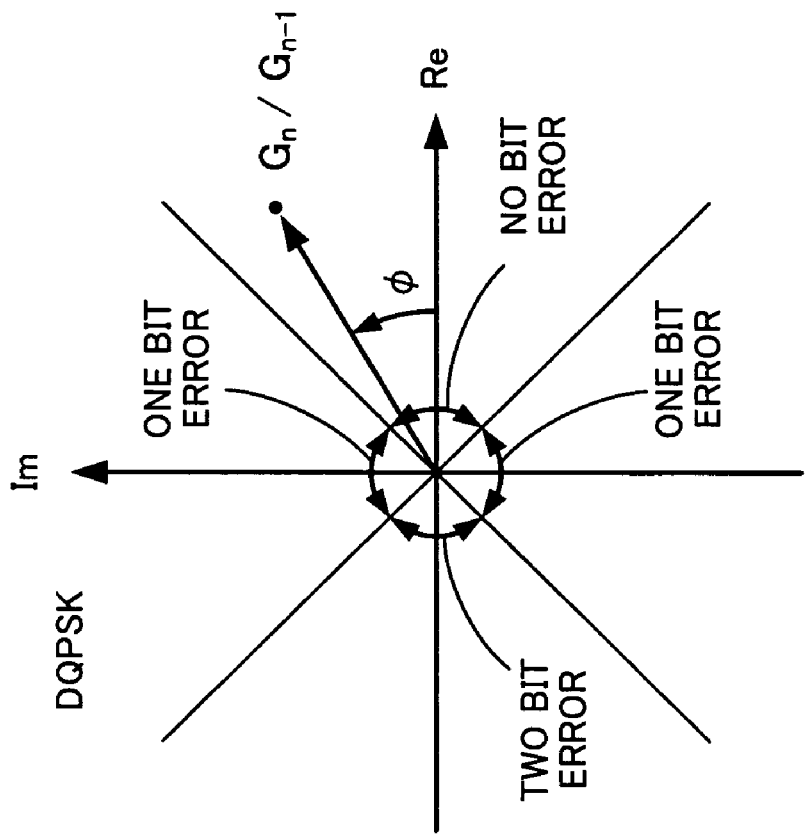

Here, with DBPSK and DQPSK used in the DSSS scheme in the IEEE802.11b standard, data demodulation is carried out using the phase difference between the current symbol and one symbol previous. Because of this, when a fluctuation vector for an nth symbol outputted from fluctuation estimating section 1402 is $G_n$, and a fluctuation vector for an n-1th symbol is $G_{n-1}$, phase difference $\phi(0\leq\phi\leq 2\pi)$ between $G_n$ and $G_{n-1}$ is obtained, and the bit error is estimated using the size of $\phi$. As shown in FIG. 19A, when communication quality of a 1 Mbps transmission (DBPSK) of the DSSS scheme is estimated as an example, in the case where $\phi$ is $0\leq\phi<\pi/2$ or $3\pi/2<\phi<2\pi$, it is estimated that this symbol can be received without error, and in the case where $\phi$ is $\pi/2\leq\phi\leq 3\pi/2$, it is estimated that one bit error will occur in this symbol. Further, as shown in FIG. 19B, when communication quality of 2 Mbps transmission (DQPSK) of the DSSS scheme is estimated, in the case where $\phi$ is $0\leq\phi<\pi/4$ or $7\pi/4<\phi<2\pi$, it is estimated that this symbol will be received without error, in the case where $\phi$ is $\pi/4\leq\phi<3\pi/4$ or $5\pi/4<\phi\leq 7\pi/4$, it is estimated that one bit error will occur in this symbol, and in the case where $\phi$ is $\pi/4\leq\phi\leq 5\pi/4$, it is estimated that two bit error will occur in this symbol. As a result of the above operation, errors for the case of communication using the DSSS scheme in the IEEE802.11b standard from the received signal of the ERP-OFDM scheme in the IEEE802.11g standard can be estimated. DSSS_BER estimating section 1403 then calculates BER based on the bit error obtained in this way and outputs this BER as estimated communication quality.

According to this embodiment, it is possible to estimate communication quality in a pseudo manner for the case where, under a communication environment where communication is carried out while switching between a plurality of types of wireless communication systems using the same frequency band between first wireless communication apparatus 1200 and second wireless communication apparatus 1201, first wireless communication apparatus 1200 estimates communication quality in a pseudo manner for the case of communication using a second wireless communication system under the same wireless transmission path environment based on a known signal received from second wireless communication apparatus 1201 using the first wireless communication system. Further, it is also possible to carry out switching of wireless communication systems efficiently and appropriately by adaptively switching wireless communication systems based on this communication quality.

In the above-described embodiment, the configuration and operation where BER of the DSSS signal in the IEEE802.11b standard is estimated and used as the communication quality have been described as an example, but the present invention is by no means limited in this respect, and other configurations and operations are possible providing a configuration for estimating a characteristic amount in the second wireless communication system in a pseudo manner using the received signal for portions transmitted for the known signal out of signals transmitted by the first wireless communication system.

Figure 20:
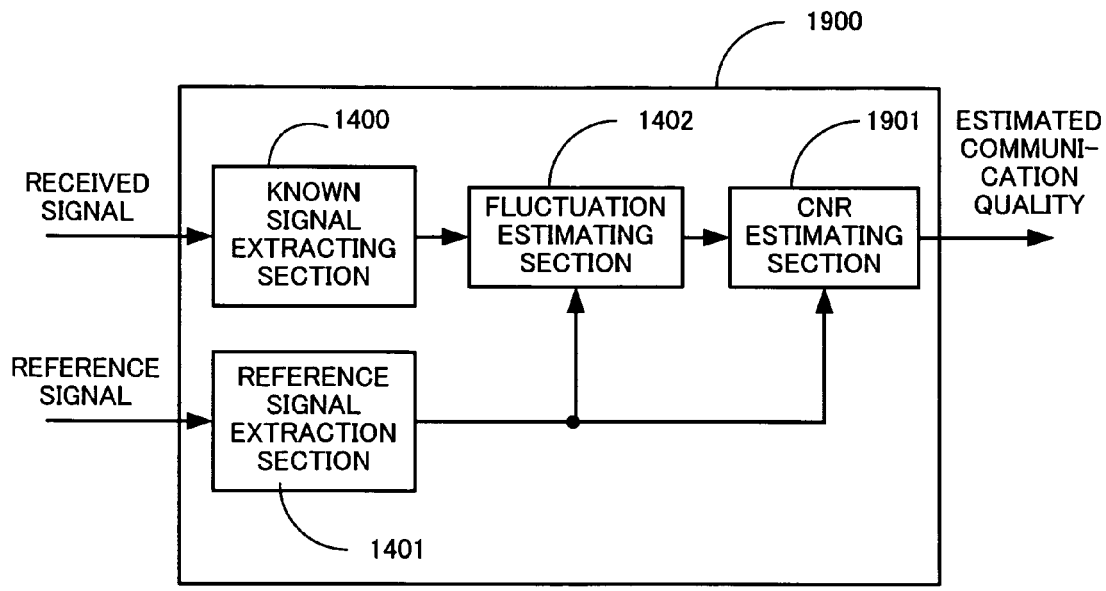
FIG. 20 is a block diagram showing a configuration example of a communication quality estimating section for the case of estimating a CNR value of Embodiment 2.

For example, the ratio of carrier power to noise power (CNR) in the second wireless communication system can be estimated in a pseudo manner from the following configuration and operation. FIG. 20 shows a configuration for communication quality estimating section 1900 for the case of estimating a CNR value. Components in FIG. 20 that are identical with one in FIG. 15 will be assigned the same reference numerals without further explanations.

CNR estimating section 1901 estimates a CNR value using a fluctuation vector per sample outputted from fluctuation estimating section 1402 and a reference signal vector per sample outputted from reference signal extracting section 1401, and outputs the estimation result for the CNR value as estimated communication quality. As a specific operation, fluctuation vector G (=g+jh) per symbol is estimated by obtaining the sum of a single symbol segment of the fluctuation vector per sample outputted from fluctuation estimating section 1402 using equation (10). Further, carrier vector (k+jl) per symbol is obtained by adding absolute values for reference signal vector (ci+jdi) per sample outputted from reference signal extracting section 1401 within the symbol segment, as shown in the following equation.

$$k + jl = \sum_{i=0}^{10} |c_i + jd_i| \quad (11)$$

CNR estimating section 1901 obtains a differential vector for the fluctuation vector and carrier vector per symbol, and calculates the square of the amplitude of this differential vector as noise power N. Further, CNR estimating section 1901 calculates the square of the amplitude of the carrier vector as carrier power C. CNR estimating section 1901 then obtains the CNR value by dividing carrier power C by noise power N, and outputs the estimation result for this CNR value as the estimated communication quality.

It is possible to estimate a CNR value for the DSSS scheme in the IEEE802.11b standard in a pseudo manner using the above configuration and operation.

In the above-described embodiment, a case has been described where CNR estimating section 1901 is provided and a ratio of carrier power to noise power is obtained, but the present invention is by no means limited in this respect, and a CINR estimating section may also be provided in place of CNR estimating section 1901, and the ratio of carrier power to interference noise power communication quality may be estimated in a pseudo manner as communication quality. A configuration is also possible where a BER value is estimated from an estimation value of a CNR value, and this BER value is then used as communication quality. To be more specific, it is possible to estimate the BER value by referring to a table from the estimation value of the CNR value.

Further, in the above-described embodiment, a case has been described where a bit error is estimated based on a phase difference between a current symbol and a symbol for one previous, BER is calculated based on this bit error, and this BER is outputted as estimated communication quality, but this is by no means limiting. For example, a configuration is also possible where phase difference $\phi$ between the current symbol and a symbol for one previous is outputted as estimated communication quality.

In the above-described embodiment, nothing specific is referred to regarding the timing of carrying out estimation. However, it is only necessary to perform estimation at the timing appropriate to the system the present invention is applied to, and a configuration where, for example, the communication quality is always estimated, or a configuration where communication quality is estimated at given fixed intervals is possible. Further, it is also possible to adopt a configuration where communication quality is estimated for the first wireless communication system where communication is currently carried out, and, in the case where communication quality of the current communication falls below a given threshold or in the case where a given threshold is exceeded, communication quality for the case of carrying out communication using the second wireless communication system may be estimated as necessary.

In the above-described embodiment, a case has been described where a wireless communication system complying with the ERP-OFDM scheme in the IEEE802.11g standard is used for the first wireless communication system, but the present invention is by no means limited in this respect, and it is also possible to adopt a configuration applying schemes using a signal of 11 MHz as the preamble signal, such as the DSSS-OFDM scheme in the IEEE802.11g standard, the ERP-PBCC scheme, and the DSSS scheme, the CCK scheme and the PBCC scheme that are compatible with the IEEE802.11b standard to the first wireless communication system. In this case, the sampling rate of the known signal for the first wireless communication system and the sampling rate for the second wireless communication system that is the target of communication quality estimation are the same at 11 MHz. It is therefore not necessary to carry out sampling rate conversion at known signal extracting section 1400 and reference signal extracting section 1401 of communication quality estimating section 1301, and application to a configuration without these two processing sections is therefore also possible. In this case, it is possible to apply either a long preamble format or a short preamble format to the preamble signal.

Further, in the above-described embodiment, a case has been described where a wireless communication system complying with the IEEE802.11b standard is used as the second wireless communication system, but the present invention is by no means limited in this respect, and it goes without saying that the same implementation as for the above embodiment is also possible in the case of using a wireless communication system complying with the IEEE802.11 standard as the second wireless communication system.

In the above-described embodiment, two types of wireless communication systems, a first wireless communication system and a second wireless communication system, have been adopted, but this is by no means limiting, and a configuration using three or more types of wireless communication systems is also possible. In this case, by adopting a configuration where both wireless section 1300 of the wireless communication apparatus and communication quality estimating section 1301 of first wireless communication apparatus 1200 can support three or more types of wireless communication systems, estimating communication quality for the case of communication using another plurality of types of wireless communication systems while carrying out communication using a given wireless communication system, comparing the estimated plurality of types of communication quality, and switching to the most efficient wireless communication system, it is possible to carry out communication more efficiently.

In the above-described embodiment, a configuration has been adopted where only first wireless communication apparatus 1200 carries out estimation of communication quality, but this is by no means limiting, and a configuration is also possible where a communication quality estimating section and reference signal storage section are provided at second wireless communication apparatus 1201, and estimation of communication quality is carried out at both first wireless communication apparatus 1200 and second wireless communication apparatus 1201.

Further, in the above-described embodiment, wireless section 1300 of first wireless communication apparatus 1200 supports the first wireless communication system and the second wireless communication system as a result of using a programmable device that is reconfigurable by rewriting of software, but this is by no means limiting, and a configuration is also possible where wireless sections supporting the first wireless communication system and the second wireless communication system are provided independently, and communication is carried out by making the wireless section to be used operate as necessary. Moreover, the number of antennas is not limited to the configuration where a single antenna is provided for a single wireless section, and a configuration is also possible where a plurality of antennas are provided for a single wireless section.

Further, in the above-described embodiment, first wireless communication apparatus 1200 has been configured with wireless section 1300, communication quality estimating section 1301, wireless section configuration storage section 1302 and reference signal storage section 1303, but this is by no means limiting, and in addition to the above-described configuration, an output section outputting a communication quality estimation result to other processing sections or equipments may also be provided. In doing so, by outputting the communication quality estimation result from the output section to external equipments such as a PC, TV and printer, it is possible to share and use the estimation result for communication quality with other equipments and output the estimation result for communication quality as images and character information. As a result, it is possible to convey the estimation result for communication quality to a user.

Further, in the above-described embodiment, a configuration has been adopted where a known signal portion is extracted at known signal extracting section 1400 of communication quality estimating section 1301 of first wireless communication apparatus 1200, but this is by no means limiting, and a configuration is possible where the known signal portion is extracted at wireless section 1300 of first wireless communication apparatus 1200, and only the known signal portion is outputted to communication quality estimating section 1301.

In the above-described embodiment, a configuration has been adopted where thinning out is carried out so that the sampling rate of the reference signal becomes equal to that of the signal of the DSSS scheme of the IEEE802.11b at reference signal extracting section 1401 of communication quality estimating section 1301 of first wireless communication apparatus 1200, but this is by no means limiting, and a configuration is also possible where a reference signal is stored in advance so that the sampling rate at the reference signal storage section 1303 of first wireless communication apparatus 1200 is equal to the signal of the DSSS scheme of IEEE802.11b. As a result of this, it is possible to use the reference signal outputted from reference signal storage section 1303 at fluctuation estimating section 1402 without using reference signal extracting section 1401, and therefore reference signal extracting section 1401 therefore does not have to be provided.

In the above-described embodiment, a configuration has been adopted where 0th, 2nd, 4th, 6th, 8th, 9th, 11th, 13th, 15th, 17th and 19th samples are extracted for twenty samples (0 to 19) within a single symbol of the received signal and reference signal of the ERP-OFDM scheme of 20 MHz so that the sampling rate of the received known signal and reference signal become 11 MHz at known signal extracting section 1400 and reference signal extracting section 1401, but this is by no means limiting, and a configuration for extracting 11 samples at an arbitrary timing within a single symbol may also be adopted. Further, a configuration is also possible where the sampling rate is converted using a sampling rate conversion filter.

Moreover, in the above-described embodiment, a configuration has been adopted where two types of storage sections, wireless section configuration storage section 1302 and reference signal storage section 1303, are provided individually, but this is by no means limiting, and a configuration is also possible where the two types of storage sections are shared, and both information necessary in the reconfiguring of wireless section 1300 and the reference signal are stored in a single storage section.

Further, in the above-described embodiment, a case has been described where a PLCP preamble portion is used as the known signal portion, but this is by no means limiting, and, this signal is only necessary to be a known signal at the receiving side, for example, and a configuration is also possible where a known signal is embedded in a PLCP header section or data section, and estimation is carried out using this signal. In this way, it is possible to increase the estimation accuracy of the communication quality by increasing the signal used in estimation of the communication quality.

Embodiment 3

In this embodiment, as in Embodiment 2, the configuration and operation will be described for the case where, under a communication environment where communication is carried out while switching between a plurality of types of wireless communication systems using the same frequency band between first wireless communication apparatus 1200 and second wireless communication apparatus 1201 as shown in FIG. 13, wireless communication apparatus 1200 estimates communication quality in a pseudo manner for the case of carrying out communication using a second wireless communication system under the same wireless transmission path environment based on a known signal received from second wireless communication apparatus 1201 using the first wireless communication system. Here, apart that differs from Embodiment 2 is that a wireless communication system complying with the CCK scheme in the IEEE802.11b standard is used in the second wireless communication system of this embodiment. Explanations about the parts that have the same configuration and operation as in Embodiment 2 will be omitted, and only the parts that have different configurations and operation will be described.

Figure 21:
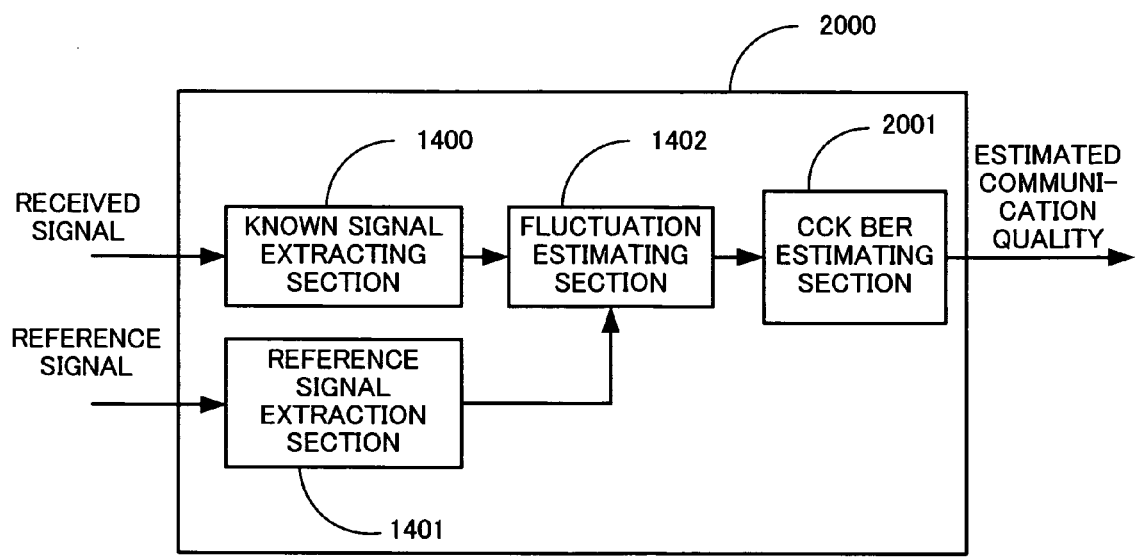
FIG. 21 is a block diagram showing a configuration example of a communication quality estimating section of Embodiment 3.

FIG. 21 shows a configuration example of communication quality estimating section 2000 of first wireless communication apparatus 1200 of this embodiment. Communication quality estimating section 2000 has known signal extracting section 1400, reference signal extracting section 1401, fluctuation estimating section 1402 and CCK_BER estimating section 2001. The configuration is different from communication quality estimating section 1301 of Embodiment 2 in that CCK_BER estimating section 2001 is provided instead of DSSS_BER estimating section 1403. The configuration and operation of known signal extracting section 1400, reference signal extracting section 1401 and fluctuation estimating section 1402 is the same as in Embodiment 2.

CCK_BER estimating section 2001 then estimates BER for the case of communication using the DSSS scheme of IEEE802.11b using the fluctuation vector outputted from fluctuation estimating section 1402, and outputs the estimation result as estimated communication quality.

Here, in this embodiment also, as in Embodiment 2, it is assumed that a PLCP preamble portion of the PPDU frame format of the ERP-OFDM scheme of IEEE802.11g is used as an example of a known signal portion. Further, it is assumed that the used frequency band of the first wireless communication system and the used frequency band of the second wireless communication system are substantially the same. Moreover, the CCK scheme in the IEEE802.11b standard includes two types, 5.5 Mbps and 11 Mbps, but a scheme of 11 Mbps will be used in this embodiment.

Regarding the above configuration, only for the parts different from Embodiment 2 will be described about specific operation where first wireless communication apparatus 1200 capable of carrying out communication while switching between the first wireless communication system complying with the ERPM-OFDM scheme in the IEEE802.11g standard and the second wireless communication system complying with the CCK scheme in the IEEE802.11b standard using the same frequency band, estimates communication quality for the case of communication using the second wireless communication system under the same wireless transmission path environment based on a received signal for communication using the first wireless communication system from second wireless communication apparatus 1201.

First, as in Embodiment 2, first wireless communication apparatus 1200 receives a signal transmitted according to the ERP-OFDM scheme in the IEEE802.11g standard from second wireless communication apparatus 1201 at wireless section 1300. Wireless section 1300 then obtains demodulation data by carrying out normal reception processing of the ERP-OFDM scheme of IEEE802.11g on this received signal, and outputs a baseband signal to communication quality estimating section 2000.

At known signal extracting section 1400, communication quality estimating section 2000 extracts the received known signal from the received signal outputted from wireless section 1300 as in Embodiment 2, and outputs this to fluctuation estimating section 1402. Further, a reference signal is also extracted at reference signal extracting section 1401 as in Embodiment 2 and outputted to fluctuation estimating section 1402. Fluctuation estimating section 1402 then estimates a fluctuation vector indicating amplitude fluctuation and phase fluctuation per sample based on the received known signal and the reference signal and outputs this fluctuation vector to CCK_BER estimating section 2001.

CCK_BER estimating section 2001 estimates whether or not an error occurs for each symbol in the case of communication using the CCK scheme of the IEEE802.11b standard under the same wireless transmission path environment using the fluctuation vector outputted from fluctuation estimating section 1402 and outputs the result as estimation communication quality. The bit error rate (BER: Bit Error Rate) is obtained as communication quality in this embodiment.

Here, a CCK scheme in the IEEE802.11b standard will be described. In the CCK scheme, spreading modulation is carried out using symbol S={s0, s1, s2, s3, s4, s5, s6, s7} shown in the following equation $$S=\{e^{j(\theta_1+\theta_2+\theta_3+\theta_4)}, e^{j(\theta_1+\theta_3+\theta_4)}, e^{j(\theta_1+\theta_2+\theta_4)}, -e^{j(\theta_1+\theta_4)},\\ e^{j(\theta_1+\theta_2+\theta_3)}, e^{j(\theta_1+\theta_3)}, -e^{j(\theta_1+\theta_2)}, e^{j\theta_1}\} \quad (12)$$

In equation (12), $\theta i$ is decided by the transmission data, and, in the case of the CCK scheme of 11 Mbps, $\theta 1$ to $\theta 4$ respectively correspond to each two bits of 8 bit transmission data T={t0, t1, t2, t3, t4, t5, t6, t7}. The correspondence of t0, t1 and $\theta 1$ is shown in table 1, and the correspondence of t0 to t7, and $\theta 2$ to $\theta 4$ is shown in table 2.

TABLE 1

| Transmission Data ($t_0, t_1$) | Phase Rotation $\theta_1$ (Even Symbols) | Phase Rotation $\theta_1$ (Odd Symbols) |
| --- | --- | --- |
| 00 | 0 | $\pi$ |
| 01 | $\pi/2$ | $3\pi/2$ ($-\pi/2$) |
| 11 | $\pi$ | 0 |
| 10 | $3\pi/2$ ($-\pi/2$) | $\pi/2$ |

TABLE 2

| Transmission Data ($t_{(i-1)\times 2}, t_{(i-1)\times 2+1}$) (i = 2, 3, 4) | Phase Rotation $\theta_i$ (i = 2, 3, 4) |
| --- | --- |
| 00 | 0 |
| 01 | $\pi/2$ |
| 10 | $\pi$ |
| 11 | $3\pi/2$ ($-\pi/2$) |

CCK_BER estimating section 2001 estimates a bit error based on the correspondence of equation (12), table 1 and table 2 using 8 samples as a single symbol for the fluctuation vector in a single sample unit outputted from fluctuation estimating section 1402 and estimates BER. A specific procedure will be described in the following. When a fluctuation vector for a single symbol portion (8 samples) is E={e0, e1, e2, e3, e4, e5, e6, e7}, from equation (12), the phase difference between e0 and e1, the phase difference between e2 and −e3, the phase difference between e4 and e5, and the phase difference between −e6 and e7 are respectively obtained, and phase fluctuation α2 of θ2 can then be obtained by averaging these phase differences. Similarly, it is possible to obtain phase fluctuation α3 of θ3 from the phase difference between e0 and e2, the phase difference between e1 and −e3, the phase difference between e4 and −e6 and the phase difference between e5 and e7, and obtain phase fluctuation α4 of θ4 from the phase difference between e0 and e4, the phase difference between e1 and e5, the phase difference between e2 and −e6 and the phase difference between −e3 and e7. Further, phase fluctuation α1 of θ1 can be obtained by substituting α2 to α4 in equation (12). The error for respective two bits of transmission data T is estimated based on the correspondence table of table 3 for α1 to α4 obtained from the procedure described above.

TABLE 3

| Phase Rotation α (0 ≦ α < 2π) | Bit Error (within 2 bits) |
|---|---|
| 0 ≦ α < π/4, or 7π/4 < α < 2π | None |
| π/4 ≦ α < 3π/4, or 5π/4 < α ≦ 7π/4 | 1 bit |
| 3π/4 ≦ α ≦ 5π/4 | 2 bits |

As a result of the above operation, estimation of errors is possible for the case of communication using the CCK scheme of the IEEE802.11b standard from the received signal of the ERP-OFDM scheme in the IEEE802.11g standard. CCK_BER estimating section 2001 then calculates BER based on the bit error obtained in this way and outputs this BER as estimated communication quality.

According to this embodiment, under a communication environment where communication is carried out while switching between a plurality of types of wireless communication systems using the same frequency band between first wireless communication apparatus 1200 and second wireless communication apparatus 1201, first wireless communication apparatus 1200 can estimate communication quality for the case of communication using a second wireless communication system under the same wireless transmission path environment based on a known signal received from second wireless communication apparatus 1201 using the first wireless communication system. Further, it is also possible to carry out switching of wireless communication systems efficiently and appropriately by adaptively switching wireless communication systems based on this communication quality.

In the above-described embodiment, nothing specific is referred to regarding the timing of carrying out estimation. It is only necessary to perform estimation at the timing appropriate to the system the present invention is applied to, and a configuration where, for example, the communication quality is always estimated, or a configuration where communication quality is estimated at given fixed intervals is possible. Further, it is also possible to adopt a configuration where communication quality is estimated also for the communication quality of the first wireless communication system where communication is currently carried out, and in the case where communication quality of the current communication falls below or exceed a given threshold, communication quality for the case of carrying out communication using the second wireless communication system is estimated as necessary.

In the above-described embodiment, a wireless communication system complying with the ERP-OFDM scheme in the IEEE802.11g standard has been used for the first wireless communication system, but the present invention is by no means limited in this respect, and it is also possible to adopt a configuration applying schemes using a signal of 11 MHz as the preamble signal such as the DSSS-OFDM scheme in the IEEE802.11g standard, the ERP-PBCC scheme, and the DSSS scheme, the CCK scheme and the PBCC scheme that are compatible with the IEEE802.11b standard, to the first wireless communication system. In this case, the sampling rate of the known signal for the first wireless communication system and the sampling rate for the second wireless communication system that is the target of communication quality estimation are the same at 11 MHz. It is therefore not necessary to carry out sampling rate conversion at known signal extracting section 1400 and reference signal extracting section 1401 of communication quality estimating section 2000, and therefore application to a configuration without these two processing sections is also possible. In this case, it is possible to apply either a long preamble format or a short preamble format to the preamble signal.

In the above-described embodiment, two types of wireless communication systems, a first wireless communication system and a second wireless communication system, have been adopted, but this is by no means limiting, and a configuration of using three or more types of wireless communication systems is also possible. In this case, by adopting a configuration where both wireless section 1300 of the wireless communication apparatus and communication quality estimating section 2000 of first wireless communication apparatus 1200 support three or more types of wireless communication systems, estimating communication quality for the case of communication using another plurality of types of wireless communication systems while carrying out communication using a given wireless communication system, comparing the estimated communication quality for a plurality of types, and by switching the wireless communication system to the most efficient wireless communication system, it is possible to carry out communication more efficiently.

In the above-described embodiment, a configuration has been adopted where only first wireless communication apparatus 1200 performs estimation of communication quality, but this is by no means limiting, and a configuration is possible where a communication quality estimating section and reference signal storage section are provided at second wireless communication apparatus 1201, and estimation of communication quality is performed at both first wireless communication apparatus 1200 and second wireless communication apparatus 1201.

Further, in the above-described embodiment, wireless section 1300 of first wireless communication apparatus 1200 support the first wireless communication system and the second wireless communication system as a result of using a programmable device that is reconfigurable by rewriting of software, but this is by no means limiting, and a configuration is also possible where wireless sections supporting the first wireless communication system and the second wireless communication system are provided independently, and communication is carried out by making the wireless section to be used operate as necessary. Moreover, the number of antennas is also by no means limited to a single antenna for a single wireless section, and a configuration is also possible where a plurality of antennas are provided for a single wireless section.

Further, in the above-described embodiment, first wireless communication apparatus 1200 has been configured with wireless section 1300, communication quality estimating section 2000, wireless section configuration storage section 1302 and reference signal storage section 1303, but this is by no means limiting, and in addition to the above-described configuration, an output section outputting a communication quality estimation result to other processing sections or equipments may also be provided. In doing so, by outputting the communication quality estimation result from the output section to external equipments such as a PC, TV and printer, it is possible to share and use the estimation result for communication quality with other equipments and output the estimation result for communication quality as images and character information. As a result, it is possible to convey the estimation result of communication quality to a user.

Further, in the above-described embodiment, a configuration is adopted where a known signal portion is extracted at known signal extracting section 1400 of communication quality estimating section 2000 of first wireless communication apparatus 1200, but this is by no means limiting, and a configuration is also possible where a known signal portion is extracted at wireless section 1300 of first wireless communication apparatus 1200, and only the known signal portion is outputted to communication quality estimating section 2000.

In the above-described embodiment, a configuration has been adopted where thinning out is carried out so that the sampling rate of the reference signal becomes equal to that of the signal of the CCK scheme of IEEE802.11b at reference signal extracting section 1401 of communication quality estimating section 2000 of first wireless communication apparatus 1200, but this is by no means limiting, and a configuration is also possible where a reference signal is stored in advance in reference signal storage section 1303 of first wireless communication apparatus 1200 so that the sampling rate is equal to the signal of the CCK scheme of IEEE802.11b. By this means, it is possible to use the reference signal outputted from reference signal storage section 1303 at fluctuation estimating section 1402 without using reference signal extracting section 1401, and therefore reference signal extracting section 1401 does not have to be provided.

In the above-described embodiment, a configuration is adopted where 0th, 2nd, 4th, 6th, 8th, 9th, 11th, 13th, 15th, 17th and 19th samples are extracted for twenty samples (0 to 19) within a single symbol for the received signal and reference signal of ERP-OFDM scheme of 20 MHz so that the sampling rates of the received known signal and reference signal become 11 MHz at known signal extracting section 1400 and reference signal extracting section 1401, but this is by no means limiting, and a configuration for extracting 11 samples at an arbitrary timing within a single symbol is also possible. Further, a configuration is also possible where the sampling rate is converted using a sampling rate conversion filter.

Moreover, in the above-described embodiment, a configuration is adopted where two types of storage sections, wireless section configuration storage section 1302 and reference signal storage section 1303, are provided individually, but this is by no means limiting, and a configuration is also possible where the two types of storage sections are shared, and both information necessary in the reconfiguring of wireless section 1300 and the reference signal are stored in a single storage section.

Further, in the above-described embodiment, a case has been described where a PLCP preamble portion is used as the known signal portion, but this is by no means limiting, and, this signal is only necessary to be a known signal at the receiving side, and a configuration is possible where a known signal is embedded in, for example, a PLCP header section or data section, and estimation is carried out using this signal. In this way, it is possible to increase the estimation accuracy of the communication quality by increasing the signal used in estimation of the communication quality.

Embodiment 4

In this embodiment, an example of a configuration and operation will be described using FIG. 22 to FIG. 30 for the case where, under a communication environment where communication is carried between first wireless communication apparatus 100 and second wireless communication apparatus 101 while switching between a plurality of types of wireless communication systems using substantially the same frequency band as shown in FIG. 2, first wireless communication apparatus 100 estimates communication quality for the case of communication using a wireless communication system of the OFDM scheme complying with the IEEE802.11g standard as the second wireless communication system, using a received signal for carrying out communication using a wireless communication system of a frequency hopping scheme complying with the Bluetooth specification as the first wireless communication system.

Here, the relationship between the frequency channels used in the Bluetooth specification and the IEEE802.11g standard is shown in FIG. 22. In the wireless communication system using the Bluetooth specification, frequency hopping is implemented on 79 frequency channels where modulation signals of 1 Mbps modulated using GFSK are arranged at 1 MHz intervals at frequency band from 2402 MHz to 2480 MHz, and communication is carried out. With respect to this, with the wireless communication system by the OFDM scheme of IEEE802.11g standard, one of 13 frequency channels arranged at MHz intervals from 2412 MHz to 2472 MHz is selected, and communication is carried out on this channel (however, the specification for the frequency band and number of channels is described for the case of being used domestically within Japan) The wave line portion of FIG. 22A shows used subcarriers in the Bluetooth specification, and FIG. 22B shows the details thereof. The trapezoid portion of FIG. 22A shows the used frequency band in the IEEE802.11g standard, and FIG. 22C shows the details thereof. Further, in FIG. 22, the channels of the Bluetooth specification are shown as <ch1>, and the channels of the IEEE802.11g standard are shown as (ch1). As shown in FIG. 22, the used frequency band of the Bluetooth specification substantially overlaps with the used frequency band of the IEEE802.11g standard. The present invention uses the fact the used frequency bands overlap, and therefore, for example, during the communication using a scheme complying with the Bluetooth specification, first wireless communication apparatus 100 and second wireless communication apparatus 101 switch the functions of first wireless communication apparatus 100 and second wireless communication apparatus 101 to the OFDM scheme of the IEEE802.11g standard, and estimate whether or not there is a communication link state in which communication may be carried out.

In the following, an example will be described for the case of estimating communication quality assuming the case of switching a communication function to a channel of 2412 MHz using a scheme complying with the IEEE802.11g standard using a received signal upon communication according to the Bluetooth specification.

Figure 23:
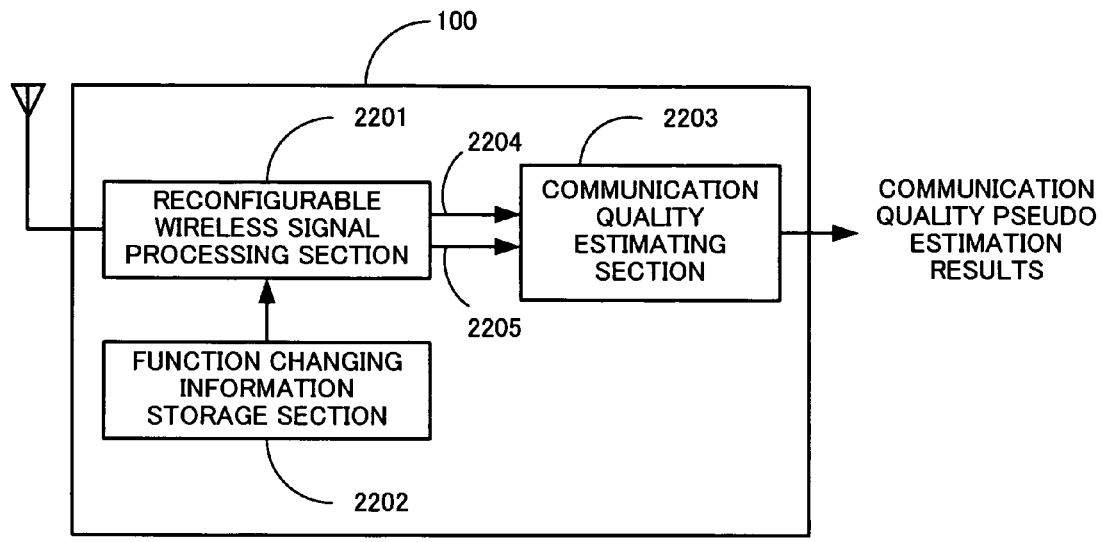
FIG. 23 is a block diagram showing a configuration example of a first wireless communication apparatus of Embodiment 4.

FIG. 23 shows a configuration of first wireless communication apparatus 100 according to this embodiment, configured with reconfigurable wireless signal processing section 2201, communication quality estimating section 2203 and function changing information storage section 2202.

Reconfigurable wireless signal processing section 2201 carries out the desired wireless communication signal processing supporting the plurality of wireless communication standards by changing the wireless signal processing functions, and outputs at least the reception result and information relating to a set channel. In this embodiment, reconfigurable wireless signal processing section 2201 is configured with functions that can be changed so as to support at least two wireless communication systems of the Bluetooth specification and the IEEE802.11g standard. More specifically, wireless signal processing supporting the wireless communication system complying with the Bluetooth specification includes modulation and demodulation processing of the GFSK scheme and processing such as frequency conversion processing to the 2.4 GHz band and frequency hopping, and wireless signal processing supporting a wireless communication system complying with the IEEE802.11g standard includes modulation and demodulation processing such as BPSK, QPSK, 16 QAM and 64 QAM and processing such as frequency conversion to 2.4 GHz and OFDM multiplexing. Further, an orthogonal vector signal is outputted as a reception result after carrying out predetermined amplification, filtering and frequency conversion, etc.

Communication quality estimating section 2203 estimates communication quality in a pseudo manner assumed in the case of carrying out communication using a wireless communication system complying with the IEEE802.11g standard under the same wireless transmission path environment using the reception result and channel setting information for signal by the wireless communication system complying with the Bluetooth specification outputted from reconfigurable wireless signal processing section 2201, and outputs a communication quality pseudo estimation result obtained in this manner.

Function changing information storage section 2202 stores software programs or configuration data necessary in changing signal processing functions at reconfigurable wireless signal processing section 2201 and supplies this to reconfigurable wireless signal processing section 2201 as necessary. In this embodiment, software programs or configuration data for setting functions for carrying out wireless signal processing supporting the Bluetooth specification, and software programs or configuration data for setting functions for carrying out wireless signal processing supporting the IEEE802.11g standard are stored in function changing information storage section 2202.

Figure 24:
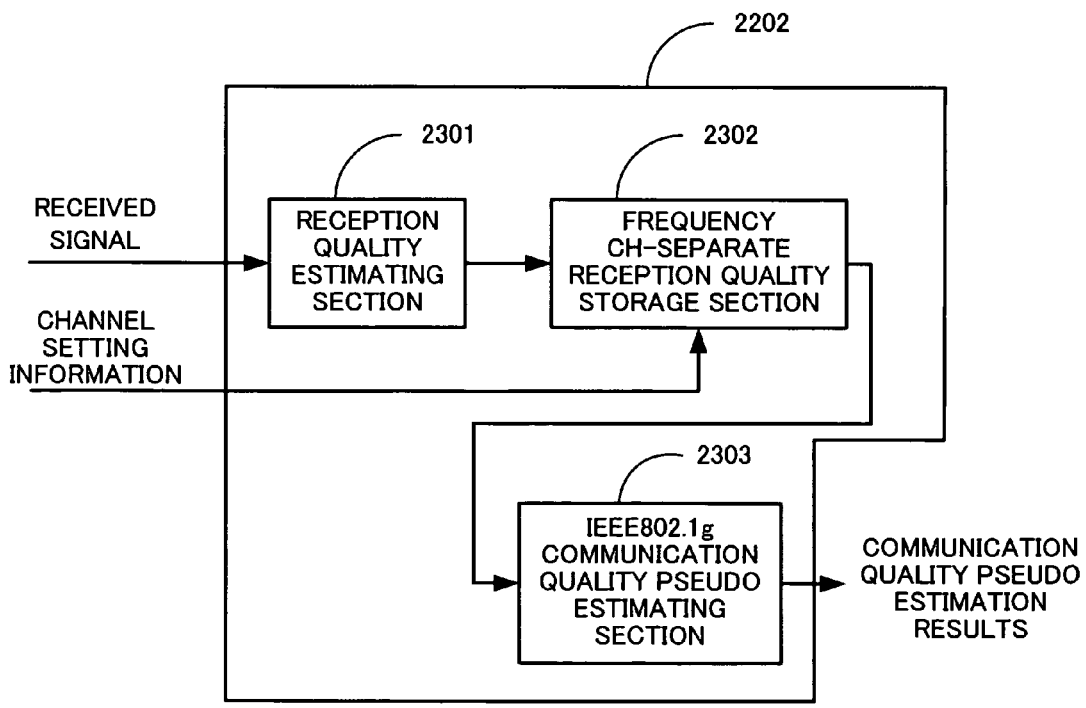
FIG. 24 is a block diagram showing a configuration example of a communication quality estimating section of Embodiment 4.

FIG. 24 shows a detailed configuration example of communication quality estimating section 2203 in FIG. 23, which is configured with reception quality estimation section 2301, frequency channel-separate reception quality storage section 2302 and IEEE802.11g communication quality pseudo estimating section 2303.

Reception quality estimation section 2301 estimates reception quality in a received slot unit in Bluetooth using the reception result of a wireless communication system complying with the Bluetooth specification inputted from reconfigurable wireless signal processing section 2201 and outputs the estimation result. The details of this operation will be described later. In this embodiment, reception quality estimation section 2301 estimates the carrier power to interference noise power ratio (hereinafter referred to as CINR: Carrier to Interference and Noise Ratio) for the received signal as the reception quality.

Frequency channel (ch)-separate reception quality storage section 2302 stores reception quality for each frequency hopping channel used in the Bluetooth specification using the inputted reception quality estimation result and channel setting information, and reads out and outputs the result as necessary. The details of this operation will be described later.

IEEE802.11g communication quality pseudo estimating section 2303 reads out reception quality information as necessary for each hopping channel stored in frequency channel-separate reception quality storage section 2302, estimates communication quality in a pseudo manner assumed in the case of carrying out communication using a wireless communication system complying with the IEEE802.11g standard under the same wireless transmission path environment, and outputs the communication quality pseudo estimation result obtained in this manner. In this embodiment, IEEE802.11g communication quality pseudo estimating section 2303 estimates a received CINR value in a pseudo manner as communication quality.

In the following, a method will be described for estimating a received CINR value as communication quality assumed in the case of changing the wireless communication system of a link to IEEE802.11g using a wireless communication signal complying with the Bluetooth specification at first wireless communication apparatus 100 by the configuration of FIG. 23 and FIG. 24.

Figure 25:
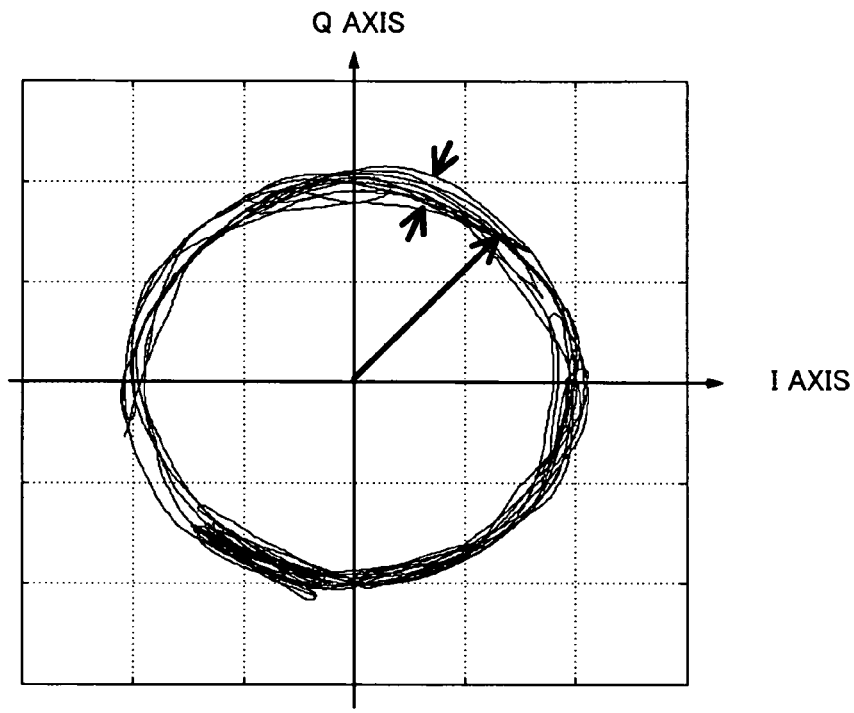
FIG. 25 shows an orthogonal vector signal plotted on a complex plane of Embodiment 4.
Figure 26:
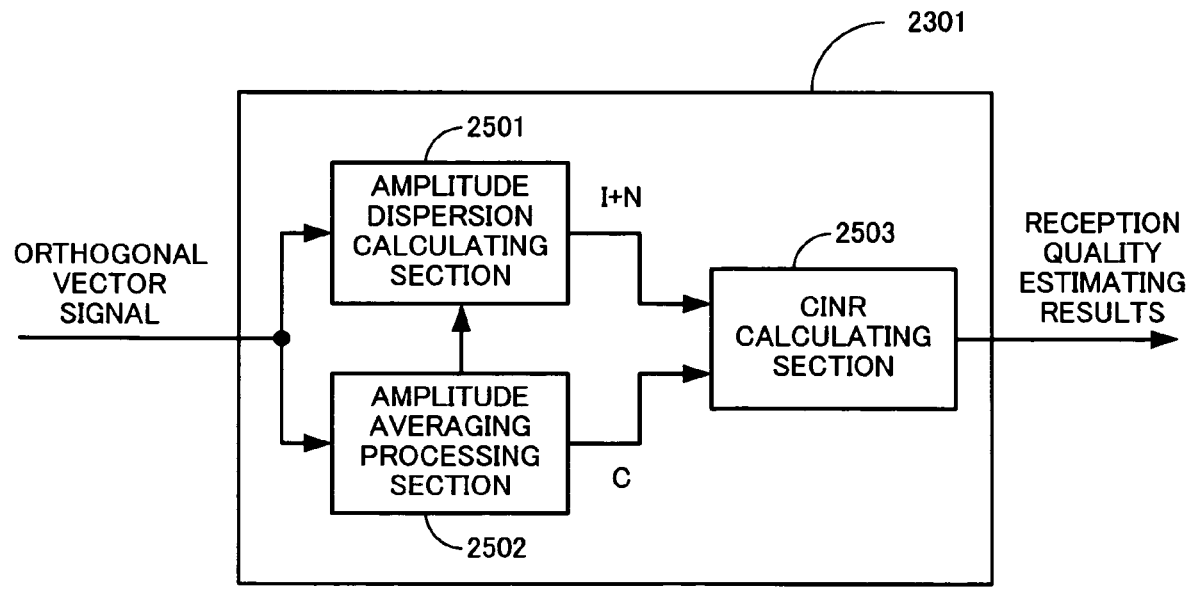
FIG. 26 is a block diagram showing a configuration example of a reception quality estimation section of Embodiment 4.

A signal transmitted using a frequency hopping scheme complying with the Bluetooth specification from second wireless communication apparatus 101 is received at an antenna at reconfigurable wireless signal processing section 2201. Reconfigurable wireless signal processing section 2201 then carries out predetermined wireless signal processing for each hopping channel in synchronization with the frequency hopping pattern. Here, predetermined wireless signal processing is, for example, amplification, filtering, frequency conversion, GFSK demodulation or codec processing. Base band orthogonal vector signal 2204 is then outputted to communication quality estimating section 2203 as the received signal obtained through this process. A signal of a wave shape as shown, for example, in FIG. 25 is then obtained by subjecting orthogonal vector signal 2204 to GFSK modulation. Further, setting information 2205 relating to the hopping channel in synchronization with the frequency hopping is also outputted to communication quality estimating section 2203. Specifically, information corresponding to channel numbers in 1 MHz unit corresponding to 1 channel (2402 MHz) to 79 channels (2480 MHz) defined in the Bluetooth specification is outputted.

At reception quality estimation section 2301 at communication quality estimating section 2203, for example, a CINR value is estimated as reception quality for each received slot using an inputted orthogonal vector signal. Various methods may be applied as the method for estimating the CINR value, but, for example, it is possible to calculate the approximate CINR value using the configuration shown in FIG. 26. Namely, averaging processing of the amplitude of the orthogonal vector is carried out on the inputted orthogonal vector signal at amplitude averaging processing section 2502, an average amplitude value is supplied to amplitude dispersion calculating section 2501, and the square value of the average amplitude value is supplied to CINR calculating section 2503 as carrier power value C. The GFSK modulated signal has a substantially fixed amplitude characteristic, and it is possible to calculate a value equivalent to the carrier power from this average amplitude value. Further, when there is a difference between the average amplitude and the amplitude of the orthogonal vector at each sample timing, the amplitude difference is equivalent to the component of influence due to interference wave and noise mixed upon reception. It is therefore possible to calculate a value equivalent to the total power of the interference wave component and the noise component in an equivalent manner by calculating the dispersion of this amplitude difference. Strictly speaking, there are cases where a slight component of amplitude fluctuation due to the influence of Gaussian filters is also contained in this difference.

This is ignored here, but processing to correct this amount of error is also possible as necessary.

Amplitude dispersion calculating section 2501 calculates an amplitude dispersion value for the orthogonal vector using the average amplitude value and the orthogonal vector signal supplied from amplitude averaging processing section 2502 and outputs the calculated dispersion value as a value for interference and noise power (I+N) to CINR calculating section 2503.

CINR calculating section 2503 calculates the ratio between the inputted carrier power value C and interference noise power value (I+N), and outputs the CINR value obtained as a result of this as a reception quality estimation result.

As a result of this operation, it is possible to obtain a received quality value equivalent to the received CINR value using the amplitude value of the orthogonal vector signal of the received GFSK signal. When a fixed error occurs in the value calculated by this method, it goes without saying that correction processing may also be implemented.

Frequency channel-separate reception quality storage section 2302 stores the CINR value that is a reception quality estimation result for each hopping frequency using the CINR value for each received slot calculated at reception quality estimation section 2301 and setting information 2205 relating to the hopping channel supplied from reconfigurable wireless signal processing section 2201. In the Bluetooth specification, channel changing is carried out by frequency hopping at a frequency of 1600 times per second. It is therefore possible to store information relating to the received CINR value for 79 channels at intervals of 1 MHz from 2402 MHz to 2480 MHz arranged in channels in the Bluetooth specification by carrying out reception quality estimation and storage for each hopping channel over a long time period.

Figure 27A:
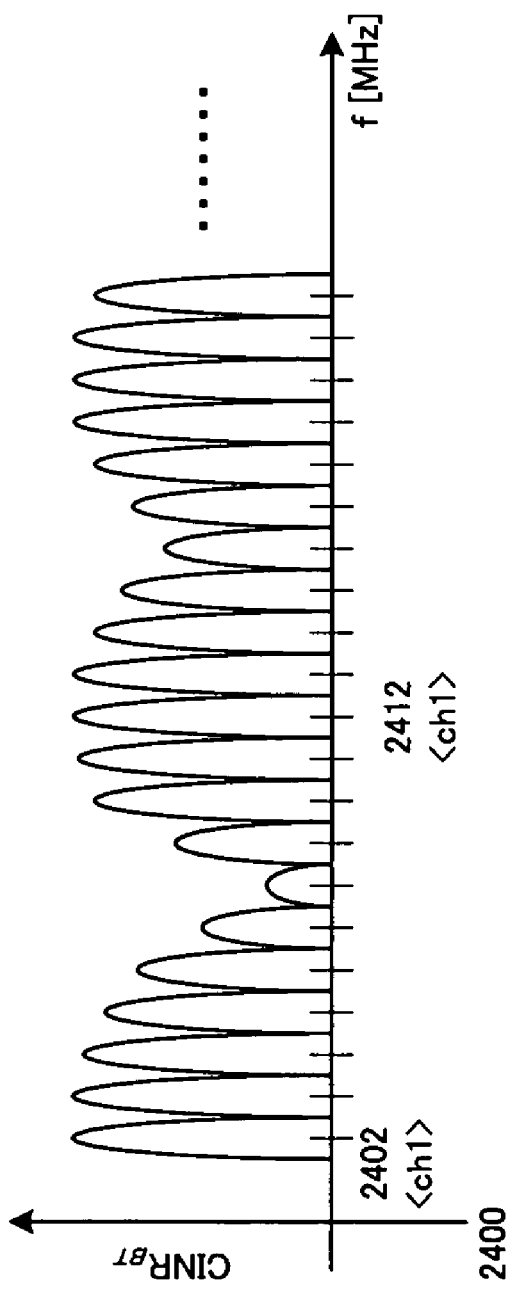
FIG. 27(*a*) shows an example of a CINR value of a received signal complying with the Bluetooth specification, and FIG. 27(*b*) shows an example of a CINR value of a received signal complying with the IEEE802.11g standard.
Figure 27B:
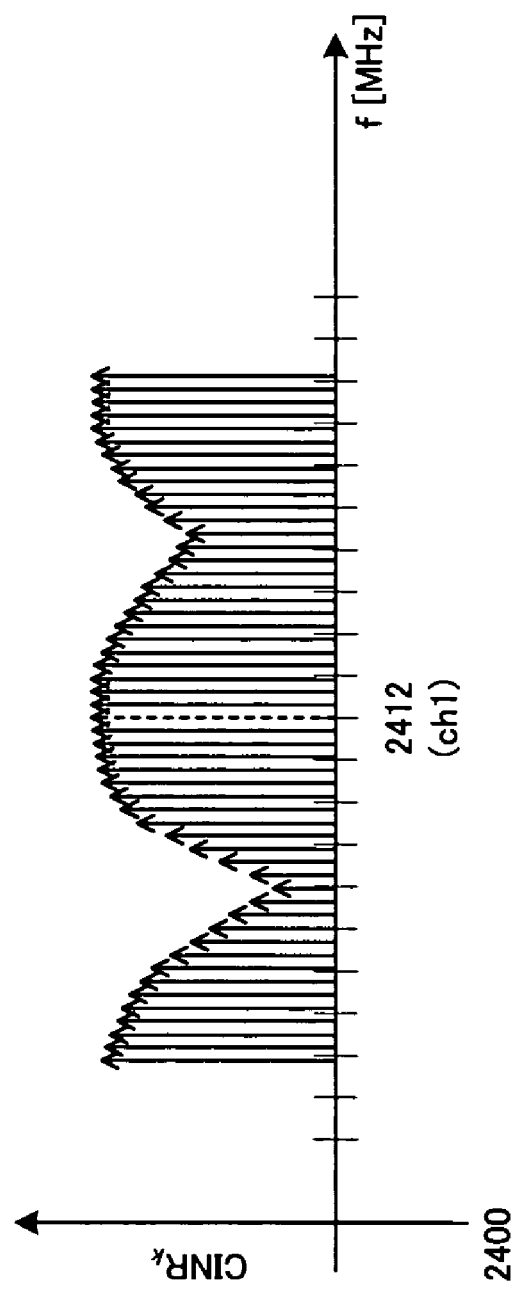

IEEE802.11g communication quality pseudo estimating section 2303 estimates communication quality in a pseudo manner for the case where first wireless communication apparatus 100 and second wireless communication apparatus 101 carry out communication by changing the wireless communication function from that complying with the Bluetooth specification to an OFDM scheme complying with the IEEE802.11g standard under the same wireless transmission path environment using information relating to the reception quality estimation result in 1 MHz unit from 2402 MHz to 2480 MHz in the Bluetooth specification stored in frequency channel-separate reception quality storage section 2302. Here, an example of communication quality pseudo estimation operation will be described for the case of, when a CINR estimation value for each hopping channel of the received signals complying with the Bluetooth specification is the state shown in FIG. 27, carrying out communication by switching to channel 1 (center frequency 2412 MHz) in the IEEE802.11g standard. FIG. 27A shows an example of a CINR value of a signal of the Bluetooth specification, and FIG. 27B shows an example of a CINR value of a signal of IEEE802.11g. In this case, CINR estimation values from 2404 MHz to 2420 MHz, out of the information of the reception quality estimation result for each hopping channel stored in frequency channel-separate reception quality storage section 2302, will be read out and used. In the case where communication is carried out using the OFDM scheme of the IEEE802.11g standard, communication is carried out using 52 subcarriers at a subcarrier interval of $\Delta f=312.5$ kHz. Here, numbers k={−26, −25, ..., −2, −1, +1, +2, ..., +25, +26} are assigned to each subcarrier. First, an assumed CINR value is calculated for each subcarrier based on the following equation.

$$CINR(k) = CINR_{BT}(k) \times \gamma_P \times \delta_{B1} \quad (13)$$

Here, CINR(k) is a pseudo estimation value of CINR at subcarrier position 'k in the case of assuming transmission by the OFDM scheme of the IEEE802.11g standard, CINRBT(k) is the estimation value of the CINR value at subcarrier position k based on reception quality information obtained from the reception result in the Bluetooth specification, γP is a transmission power correction parameter, and γB1 is a filter bandwidth correction term. The details of each will be described in the following.

CINRBT(k) can be calculated, for example, using the following equation.

$$CINR_{BT}(k) = CINR\_tbl(f_{BT}) \quad (14)$$

Here, CINR_tbl(fBT) is a CINR estimation value at hopping channel frequency fBT in the Bluetooth specification, and is a value stored in and read out from frequency channel-separate reception quality storage section 2302. fBT can be converted for example, using the following equation.

$$f_{BT} = \text{round}\{f_{SC}(k)\} \quad (15)$$

Here, round{ } indicates processing for rounding a value to a MHz place, that is, round { } means processing applied to hopping frequency channels of the Bluetooth specification by rounding the frequency under the MHz place at subcarrier position k of the OFDM signal in the IEEE802.11g standard. Here the case of using a channel where the OFDM signal has a center frequency of 2412 MHz is assumed, and fsc(k) can be expressed using the following equation.

$$f_{SC}(k) = 2412 + (k-26)\Delta f \quad (16)$$

Transmission power correction parameter γP is a parameter for correcting a difference in carrier power assumed based on a difference in transmission power in a transmission system and a difference in amplifier gain in a receiving system between for the case where first wireless communication apparatus 100 and second wireless communication apparatus 101 carry out communication by setting a function to a scheme complying with the Bluetooth specification and for the case of carrying out communication by setting a function to a scheme complying with the IEEE802.11g standard. For example, when it is assumed that, transmission power is 1 mW in the case of communication by the Bluetooth specification, transmission power is 100 mW in the case of communication by the IEEE802.11g standard, and amplifier gain of the receiving system is the same in both cases, it is expected that the receiving carrier power for communication by IEEE802.11g will be 100 times, so that γP=100.

Filter bandwidth correction term γB1 is a parameter for, when first wireless communication apparatus 100 and second wireless communication apparatus 101 set a function to a scheme complying with the Bluetooth specification, and in the case where a pass frequency bandwidth of a channel selecting filter in the receiving system is set to be broader frequency band than the occupied frequency bandwidth of the GFSK modulation scheme, correcting power of a noise and interference component passing through the filter and mixed in so as not to become large compared to the time of reception using the IEEE802.11g standard. For example, when the occupied frequency bandwidth is 1 MHz for the case of communication using GFSK according to the Bluetooth specification, and the pass frequency bandwidth of the receiving filter in the receiving system is 2 MHz, power of the noise and interference component with two times of the frequency bandwidth of the GFSK modulation spectrum is mixed, and therefore correction is performed by setting γB1=1/0.5=2.0.

Based on pseudo estimation value CINR(k) of the CINR value for each subcarrier of the OFDM signal in the IEEE802.11g standard calculated as described above, the CINR value for the whole OFDM signal can be calculated from the following equation.

$$CINR_{11g} = \text{avg}\{CINR(k)\}_k \times \gamma_{B2} \qquad (17)$$

Here, avg{ }k indicates averaging processing over all the elements k.

As described above, according to this embodiment, it is possible to estimate a received CINR value in a pseudo manner as communication quality assumed in the case of carrying out communication using the OFDM scheme complying with the IEEE802.11g standard as a wireless function under the same wireless transmission path environment, using the received signal upon communication using a frequency hopping scheme complying with the Bluetooth specification between the first wireless communication apparatus and second wireless communication apparatus that are capable of changing functions.

In this embodiment, a case has been described as an example where the CINR value is used as a parameter indicating communication quality estimated in a pseudo manner, but this is by no means limited to the CINR value, and a configuration and operation are possible of estimating, for example, an index value indicating multipath conditions and assumed bit error rates instead.

Figure 28:
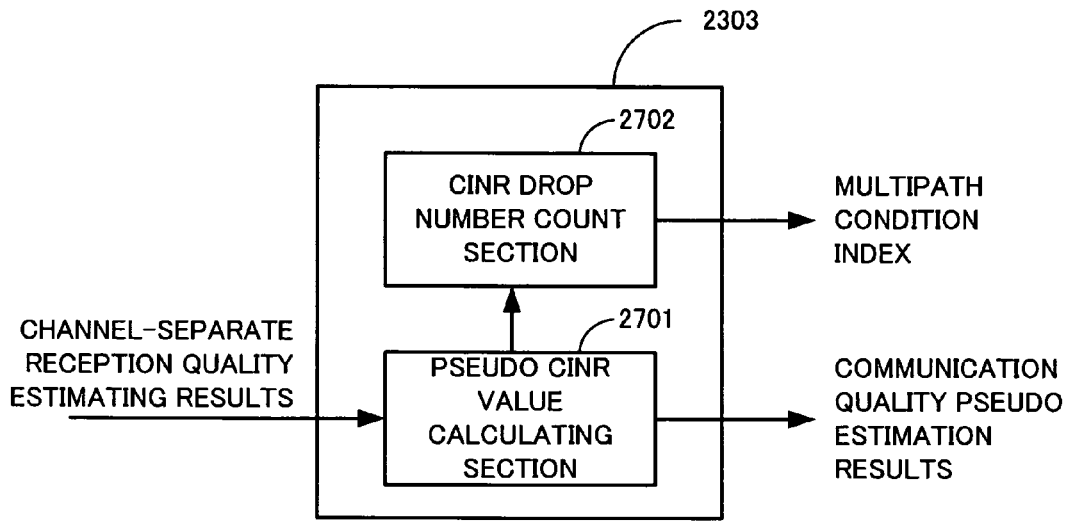
FIG. 28 is a block diagram showing a configuration example of an IEEE802.11g communication quality pseudo-estimation section for the case of estimating an index value indicating multipath conditions of Embodiment 4.

For example, when the index value indicating multipath conditions is estimated, as shown in FIG. 28, at IEEE802.11g communication quality pseudo estimating section 2303, it is appropriate to provide pseudo CINR value calculating section 2701 that calculates and outputs a CINR value in a pseudo manner using the processing of equation (13) to equation (17) described above and separately outputs a CINR estimation value for each subcarrier obtained from equation (13), and CINR drop number count section 2702 that detects whether or not the CINR value has a drop as shown in the example in FIG. 27 within multicarriers constituting the OFDM signal using the CINR value estimated for each subcarrier, and outputs the count result of the number of this drop when the drop is detected as an index value of multipath conditions. Here, when a plurality of power drops exist within the frequency band of the OFDM modulation signal, there may exist multipath waves with a comparatively large delay time, and there is a fear of causing substantial quality deterioration for transmission by the OFDM scheme. With regards to this, when the number of drops is small, it can be predicted that multipaths do not exist, or multipaths with a comparatively short delay time exist, and the quality of the wireless transmission path is comparatively good. Further, it is also possible to use the scale of the amount of change according to subcarrier positions of a CINR value as an index for multipath conditions instead of counting the number of CINR drops as described above. In this case, it is shown that the degree of multipath influence at a wireless transmission path is large when the amount of change is large.

Figure 29:
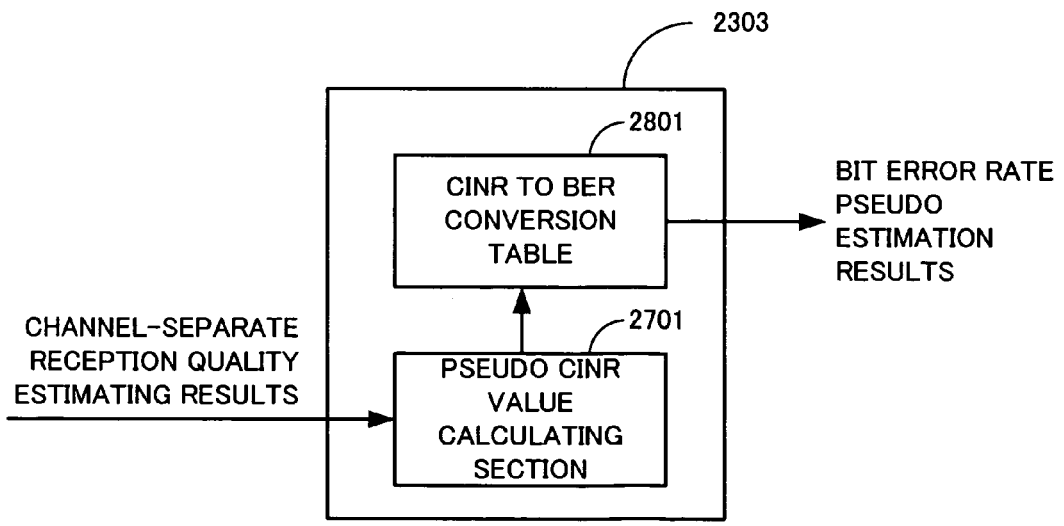
FIG. 29 is a block diagram showing a configuration example of the IEEE802.11g communication quality pseudo-estimation section for the case of estimating BER from the CINR value of Embodiment 4.
Figure 30:
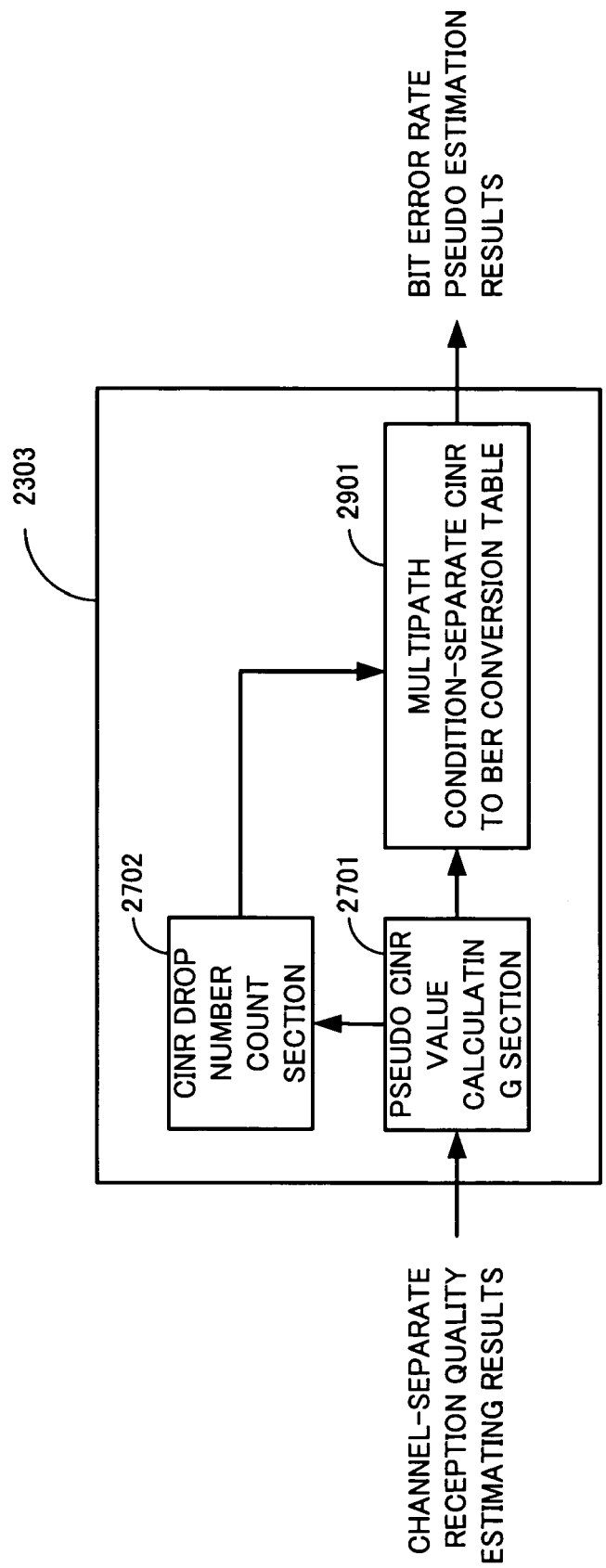
FIG. 30 is a block diagram showing a configuration example of the IEEE802.11g communication quality pseudo-estimation section for the case of estimating BER from an index value of multipath conditions of Embodiment 4.

Further, as shown in FIG. 29, for example, it is also possible to provide CINR to BER conversion table 2801 that acquires in advance a relationship between the CINR value and received bit error rate for the case of carrying out communication using IEEE802.11g and stores it as a read-out table, instead of CINR drop number count section 2702, and estimate a received bit error rate for the whole of the OFDM signal by reading out the bit error rate assumed for each subcarrier from table 2801 based on the CINR pseudo-estimation value for each subcarrier component in the OFDM signal obtained using equation (13) and performing averaging over all the subcarrier components. Moreover, as shown in FIG. 30, it is also possible to adopt a configuration of providing multipath condition-separate CINR to BER conversion table 2901 that stores bit error rate characteristics obtained for each case of the conditions based on the index value for multipath conditions estimated by CINR drop number count section 2702 as a plurality of tables and selecting an optimum table based on the estimated multipath conditions out of a plurality of CINR to BER characteristic tables and estimating a bit error rate in a pseudo manner.

Further, in this embodiment, the Bluetooth specification and the IEEE802.11g standard have been described as examples of wireless communication standards used in communication between the first wireless communication apparatus and the second wireless communication apparatus, but the present invention is by no means limited in this respect. The essence of the present invention is that, in the case of carrying out communication while switching between a wireless communication system by frequency hopping and a wireless communication system by OFDM between wireless communication apparatuses capable of switching functions, communication quality assumed in the case of carrying out communication by switching to the OFDM scheme is estimated in a pseudo manner using a received signal for during communication using the wireless communication system by frequency hopping, and if these essential portions are shared, it is possible to apply to other wireless communication standards.

Further, embodiments have been described in the case of using IEEE802.11g standard as an example of an OFDM scheme, but it is by no means necessary that the wireless communication system that is the target of pseudo communication quality estimation be an OFDM scheme, and it is possible to apply to the case where, for example, the DSSS (Direct Sequence Spread Spectrum) scheme and CCK scheme that may be seen in the IEEE802.11b standard are target. In this case, in this embodiment, it is not necessary to perform communication quality estimation that has been performed in subcarrier unit in the OFDM signal, and it is possible to adopt a configuration of estimating communication quality in a pseudo manner by performing averaging, interpolation processing, or maximum value synthesis according to spectrum shapes, of reception quality estimation values for each hopping channel of the portions overlapped with the frequency band used in IEEE802.11b using reception quality information estimated for each hopping channel.

Further, the present invention is not limited by the configuration of reconfigurable wireless signal processing section 2201, and, if reconfigurable wireless signal processing section 2201 is capable of changing the wireless signal processing functions between a function supporting the Bluetooth specification and a function supporting the IEEE802.11g standard, a configuration different from the configuration example of this embodiment is possible.

Further, in the Bluetooth specification, there are cases where all of the hopping channels prepared for the 79 channels are not used depending on the communication operation mode, but in this kind of situation, estimation of communication quality in frequency band corresponding to hopping channels that are not used may divert the estimation result of communication quality of adjacent used hopping channels, or may use a value resulting from averaging processing or interpolation processing of communication quality in adjacent hopping channels on both the up side and the down side.

Further, at frequency channel-separate reception quality storage section 2302, in order to store the reception quality estimation result for each hopping channel, for the operation in the case where reception quality information for the channel is already stored in frequency channel-separate reception quality storage section 2302, appropriate method may be selected according to environments the system and wireless communication apparatus are implemented and the specification patterns. For example, under an environment where it is predicted that the surrounding environment will change moment by moment, it is also possible to adopt a configuration where the estimation result is overwritten so as to store the most recently obtained information. Conversely, when it is predicted that the surrounding environment will not fluctuate so much, by carrying out averaging processing between the reception quality estimation value already stored and newly acquired value, it is also possible to perform control so as to reduce the influence of estimation errors.

Further, in the present invention, the method for estimating communication quality in a pseudo manner is by no means limited to the calculation processing shown in equation (13) to equation (17), and other calculation processing may also be used providing operations that meet the original intent of the respective processing. For example, processing for calculating estimation value CINRBT(k) for a CINR value at subcarrier position k based on reception quality information obtained from the reception result in the Bluetooth specification is by no means limited to calculation processing based on equation (14) and equation (15), and, processing is also possible that estimates the CINR value at the subcarrier position by performing interpolation processing according to a distance between the subcarrier position and the positions of the two hopping channels using the stored values of the CINR values in the two hopping channels of the Bluetooth specification that are adjacent on both the up side and the low side of each subcarrier position in the OFDM signal of the IEEE802.11g standard. Further, the object of correction performed in the process of communication quality calculation by correction parameters γP and γB is to, when there is a cause of difference assumed in communication quality due to a difference between a specification of a communication system for the case of communication using the Bluetooth specification and a specification of a communication system for the case of communication using the IEEE802.11g standard, perform processing for correcting the portions corresponding to the difference. When there is a term requiring correction in addition to the correction term shown in this example, it is possible to add correction parameters or adopt a configuration where correction processing is not carried out providing that the correction is within a range that can be ignored from a viewpoint of accuracy.

Embodiment 5

In this embodiment, when a wireless transmission path environment is the multipath environment in Embodiment 1, the operation of the first wireless communication apparatus for improving estimation accuracy will be described where first wireless communication apparatus 100 estimates communication quality in a pseudo manner for the case of communication using the second wireless communication system (in this case, a wireless communication system complying with the OFDM scheme in the IEEE802.11g standard) under the same wireless transmission path environment, based on a known signal received from second wireless communication apparatus 101 using the first wireless communication system (in this case, a wireless communication system complying with the DSSS scheme in the IEEE802.11b standard). The configurations of first wireless communication apparatus 100 and communication quality estimating section 201 in this embodiment are the same as in FIG. 3 and FIG. 4 respectively, and therefore a description of the operation that is the same as in Embodiment 1 will be omitted, and parts that perform different operation will be described.

A multipath environment differs from the case of a static propagation environment in that frequency-selective phasing occurs in the received signal due to interference of delayed waves. As a result, the phase and amplitude of the received known signal fluctuate. Further, the degree of influence from delayed waves due to multipaths differs depending on the wireless communication system used in communication at this time. For example, a redundant signal known as a guard interval is inserted in the transmission signal with the purpose of avoiding interference between symbols due to delayed waves in the wireless communication system complying with the OFDM scheme in the IEEE802.11g standard. The guard interval signal copies a fixed period of the rear end of the IFFT output signal series and performs insertion by connecting to the front end of the IFFT output signal series. As a result of doing this, a signal becomes continuous in the connection part between the guard interval portion and the IFFT output portion. By demodulating signal portions after the guard interval where adjacent symbol components of the delayed waves do not overlap, it is possible to receive signals without interference between symbols due to the delayed waves.

On the other hand, in the wireless communication system complying with the DSSS scheme in the IEEE802.11b standard, the guard interval signal described above does not exist. The wireless communication system complying with the IEEE802.11g standard is therefore a communication scheme that is not easily affected by delayed waves due to multipaths compared to the wireless communication system complying with the IEEE802.11b standard.

In this way, there is a difference in resistance to the delayed waves in the wireless communication systems, and therefore, in a multipath environment, when first wireless communication apparatus 100 estimates communication quality i in a pseudo manner for the case of communication using the second wireless communication system based on a received signal from second wireless communication apparatus 101 using the first wireless communication system, the estimation accuracy deteriorates compared to the estimation accuracy under a static propagation environment.

In this embodiment, operation of the first wireless communication apparatus for improving estimation accuracy of communication quality will be described by implementing the effect of the guard interval in the IEEE802.11g standard in the communication estimation method described in Embodiment 1 at a PLCP preamble portion of the IEEE802.11b standard.

After carrying out conversion processing specific or similar to the second wireless communication system on a known signal portion of a received signal received using the first wireless communication system from second wireless communication apparatus 101 outputted from wireless section 200 and a reference signal outputted from reference signal storage section 203, communication quality estimating section 201 estimates the communication quality for the case of communication using the second wireless communication system under the same wireless transmission path environment by comparing these, and outputs the estimation result.

Here, the known signal portion is a signal portion where the content and position of this signal are already known on the transmission side and the receiving side, and a preamble portion inserted within the communication packet or a pilot signal portion can be applied. In this embodiment, a PLCP preamble portion of the PDDU frame format of IEEE802.11b is used as in Embodiment 1, but the difference with Embodiment 1 is that a signal series used in communication quality estimation is further limited within the PLCP preamble portion.

Next, a method will be described for extracting a signal series used in communication quality estimation from a PLCP preamble portion of IEEE802.11b with guard intervals of IEEE802.11g taken into consideration. In this embodiment, in order to provide effects as a guard interval of IEEE802.11g to a signal series extracted from the PLCP preamble portion, a signal series is extracted where, out of a signal series of an arbitrary length, a series of a fixed period of the rear end corresponds to a series of a fixed period of a front end. A specific extraction example will be shown.

Figures 31, 32, 33, 34:
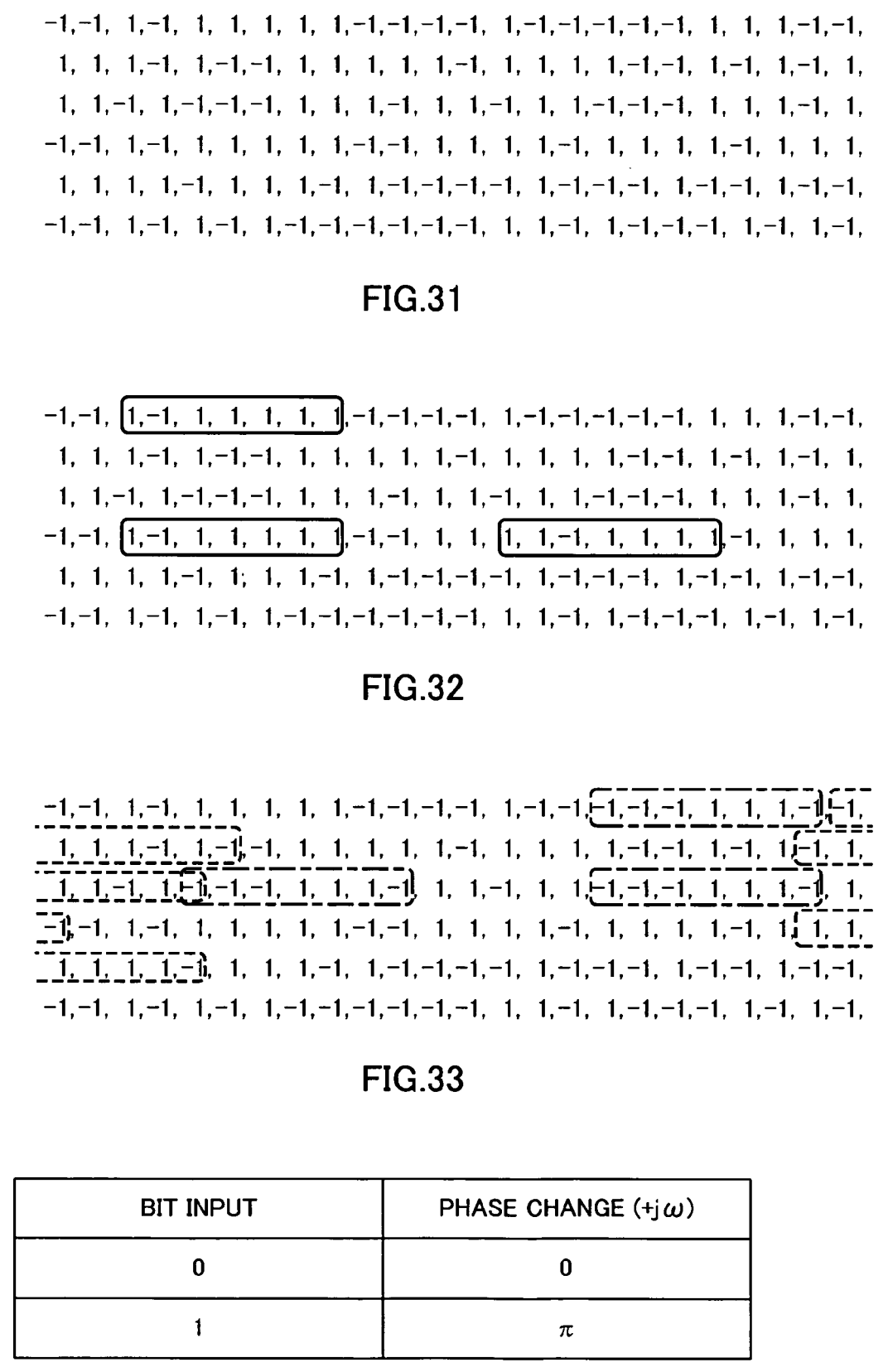

A time domain signal (real section) after DBPSK modulation of the PLCP preamble portion of IEEE802.11b is shown in FIG. 31. A signal series of an arbitrary length is then extracted out of the signal series, where a signal series of a fixed period of the rear end corresponds to a signal series for a fixed period of a front end. The guard interval length of IEEE802.11g is 0.8 μsec. On the other hand, the bit rate of the PLCP preamble portion of IEEE802.11b is 1 Mbps, so that one bit length is 1 μsec. This is substantially the same time length as the IEEE802.11g guard interval, and therefore, here, an arbitrary one bit out of the PLCP preamble portion is regarded as the guard interval. Namely, a signal series is extracted from the signal series shown in FIG. 31, where the final one bit corresponds to the front one bit. The length of the signal series during extraction is not particularly limited, but if too short, the frequency characteristic of the PLCP preamble portion of IEEE802.11b may not be sufficiently expressed. The above things taken into consideration, a signal series of seven bits of "1, −1, 1, 1, 1, 1, 1" is extracted in this embodiment. The seven bit signal series can be extracted from three locations from the PLCP preamble portion as shown in FIG. 32.

Reference signal storage section 203 stores in advance a known signal used in estimation of communication quality as a reference signal. In this embodiment, the signal series extracted from the PLCP preamble portion as described above are stored in a time domain signal as a reference signal.

Known signal extracting section 300 extracts a known signal portion from the received signal, and outputs this signal to DFT section 301 as a received known signal. In this embodiment, the signal series extracted from the PLCP preamble portion as described above are outputted using the time domain signal as a received known signal.

DFT section 301 converts the received known signal outputted from known signal extracting section 300 from a time domain to a frequency domain by carrying out discrete Fourier transform processing. As a result, the frequency characteristic of the received known signal is obtained, and this frequency characteristic is outputted to noise power estimating section 303.

DFT section 302 converts the reference signal outputted from reference signal storage section 203 from a time domain to a frequency domain by carrying discrete Fourier transform processing as with DFT section 301. As a result, the frequency characteristic of the reference signal is obtained, and this frequency characteristic is outputted to noise power estimating section 303 and carrier power estimating section 304.

In the case of this embodiment, DFT section 301 and DFT section 302 carry out conversion of the extracted signal series from a time domain to a frequency domain as follows. In reality, the extracted signal series are spread to eleven times using Barkers code. In order to carry out conversion of the signals in this spread state to a frequency domain, the length of the signal series is an integer multiple of 11. It is therefore not possible to use FFT processing such as in Embodiment 1. In this embodiment, the first one bit of the extracted signal series is handled as a guard interval, and DFT processing is therefore carried out on the remaining six bits except this one bit. Here, the scale of DFT is 6×11=66 points. By using the DFT output obtained in this way in communication quality estimation, it is possible to obtain the same effects as for a guard interval in the IEEE802.11b standard which has originally no guard interval.

According to this embodiment, under a communication environment where communication is carried out while switching between a plurality of types of wireless communication systems using the same frequency band between first wireless communication apparatus 100 and second wireless communication apparatus 101, when first wireless communication apparatus 100 estimates communication quality in a pseudo manner for the case of communication using a second wireless communication system under the same wireless transmission path environment based on a received signal from second wireless communication apparatus 101 using a first wireless communication system, even if a guard interval is inserted with the second wireless communication system complying with an OFDM scheme, it is possible to estimate communication quality with the effects of the guard interval taken into consideration and improve estimation performance of communication quality under the multipath environment. Further, by adaptively switching wireless communication systems based on this communication quality, it is possible to carry out switching of wireless communication systems efficiently and appropriately.

In this embodiment, a signal series of "1, −1, 1, 1, 1, 1, 1" is extracted, but other signal series may also be extracted. For example, in addition to "1, −1, 1, 1, 1, 1, 1", as shown in FIG. 33, series of "−1, −1, −1, 1, 1, 1, −1" (dashed line), or "−1, 1, 1, 1, −1, 1, −1" (dotted line) can also be extracted, or other signal series may be extracted.

Further, in this embodiment, a configuration is adopted where signal sections are extracted for preamble signals after DBPSK modulation, but this is by no means limiting, and it is also possible to determine signal segments to be extracted using PLCP preamble before DBPSK modulation. In DBPSK modulation of the IEEE802.11b standard, modulation processing is carried out by rotating a phase using a correspondence relationship shown in FIG. 34 with respect to the input bits, and therefore it is only necessary to extract a signal series including an even number of bits of "1".

The present application is based on Japanese Patent Application No. 2004-160333 filed on May 28, 2004, and Japanese Patent Application No. 2005-154651 filed on May 26, 2005, the entire contents of which are expressly incorporated herein by reference.

INDUSTRIAL APPLICABILITY

A wireless communication apparatus and communication quality estimating method of the present invention provides an advantage of being capable of effectively and appropriately estimating communication quality for the case of communication using a wireless communication system to be switched based on a received signal of a wireless communication system currently carrying out communication without switching from the wireless communication system currently carrying out communication, and is useful in adaptive communication fields etc. where the wireless communication systems are switched according to the conditions of the communication path etc.

The invention claimed is:

1. A wireless communication apparatus comprising:
a wireless section that receives a signal transmitted using a wireless communication system based on a first wireless communication standard; and
a communication quality estimating section that estimates communication quality in a pseudo manner for the case of transmitting a signal using a wireless communication system based on a second wireless communication standard different from the first wireless communication standard in which frequency band occupied by a wireless signal of the first wireless communication standard is partially or completely overlapped, using a signal for a wireless communication system based on the first wireless communication standard received by the wireless section, wherein:
the wireless section receives a known signal transmitted using the wireless communication system based on the first wireless communication standard;
the wireless communication apparatus further comprises a reference signal storage section that stores the known signal in advance as a reference signal; and
the communication quality estimating section estimates communication quality in a pseudo manner for the case of transmitting a signal using the wireless communication system based on the second wireless communication standard different from the first wireless communication standard in which frequency band occupied by the wireless signal of the first wireless communication standard is partially or completely overlapped, using at least a part of the known signal received by the wireless section and at least a part of the reference signal stored in the reference signal storage section.

2. The wireless communication apparatus according to claim 1, wherein the communication quality estimating section estimates communication quality in a pseudo manner for the ease of transmitting a signal using the wireless communication system based on the second wireless communication standard by carrying out conversion processing specific to the wireless communication system based on the second wireless communication standard on the known signal received at the wireless section and the reference signal stored in the reference signal storage section and carrying out comparison.

3. The wireless communication apparatus according to claim 2, wherein the communication quality estimating section comprises:
a first frequency conversion processing section that converts a received signal of the known signal segment inserted by the wireless communication system based on the first wireless communication standard from a time domain signal to a received frequency domain signal;
a second frequency conversion processing section that converts the time domain signal of the known signal segment stored in advance in the reference signal storage section as a reference signal from a time domain signal to a frequency domain signal; and
a BER estimating section that estimates communication quality in a pseudo manner for each frequency component using a received frequency domain signal obtained by the first frequency conversion processing section and a frequency domain signal for a reference signal obtained at the second frequency conversion processing section.

4. The wireless communication apparatus according to claim 3, wherein the BER estimating section obtains a bit error rate (BER) by comparing the received frequency domain signal obtained by the first frequency conversion processing section and the frequency domain signal for the reference signal obtained by the second frequency conversion processing section.

5. The wireless communication apparatus according to claim 3, wherein the BER estimating section estimates communication quality for each arbitrary frequency band in a pseudo manner using a received frequency domain signal for each arbitrary frequency band obtained by the first frequency conversion processing section and a frequency domain signal for the reference signal for each arbitrary frequency band obtained by the second frequency conversion processing section.

6. The wireless communication apparatus according to claim 3, wherein the BER estimating section estimates communication quality for each OFDM subcarrier frequency band in a pseudo manner using a received frequency domain signal for each OFDM subcarrier frequency band obtained by the first frequency conversion processing section and a frequency domain signal for the reference signal for each OFDM subcarrier frequency band obtained by the second frequency conversion processing section.

7. The wireless communication apparatus according to claim 2, wherein the communication quality estimating section estimates communication quality in a pseudo manner for the case of transmitting a signal using the wireless communication system based on the second wireless communication standard by comparing a frequency characteristic of the received known signal and a frequency characteristic of the reference signal stored in the reference signal storage section.

8. The wireless communication apparatus according to claim 2, wherein the communication quality estimating section comprises:
a first frequency conversion processing section that converts a received signal of a known signal segment inserted by the wireless communication system based on the first wireless communication standard from a time domain signal to a received frequency domain signal;
a second frequency conversion processing section that converts a time domain signal for the known signal segment stored in advance in the reference signal storage section as a reference signal from a time domain signal to a frequency domain signal;
a noise power calculating section that obtains a frequency domain signal for a noise component from a difference between a received frequency domain signal obtained by the first frequency conversion processing section and a frequency domain signal of a reference signal obtained at the second frequency conversion processing section, and obtains a frequency domain signal for noise power using the obtained frequency domain signal for the noise component;
a carrier power calculating section that obtains a frequency domain signal for carrier power using a frequency domain signal for a reference signal obtained at the second frequency conversion processing section; and
a CNR estimating section that estimates communication quality in a pseudo manner for each frequency component using a frequency domain signal for noise power obtained at the noise power calculating section and a frequency domain signal for carrier power obtained at the carrier power calculating section.

9. The wireless communication apparatus according to claim 8, wherein the CNR estimating section calculates a ratio between a frequency domain signal for noise power obtained at the noise power calculating section and a frequency domain signal for carrier power obtained at the carrier power calculating section and thereby obtains a ratio of carrier power to noise power (CNR) or a ratio of carrier power to interference noise power (CINR).

10. The wireless communication apparatus according to claim 8, wherein the noise power calculating section obtains a frequency domain signal for a noise component from a difference between a received frequency domain signal obtained by the first frequency conversion processing section and a frequency domain signal for the reference signal obtained by the second frequency conversion processing section, obtains a frequency domain signal for noise power using an obtained frequency domain signal for the noise component, adds up frequency domain signals for noise component within arbitrary frequency band, and thereby obtains a frequency domain signal for noise power for each arbitrary frequency band.

11. The wireless communication apparatus according to claim 8, wherein the carrier power calculating section obtains a frequency domain signal for carrier power using a frequency domain signal for a reference signal obtained by the second frequency conversion processing section, adds up frequency domain signals for carrier power within arbitrary frequency band, and thereby obtains a frequency domain signal for carrier power for each arbitrary frequency band.

12. The wireless communication apparatus according to claim 8, wherein the CNR estimating section estimates communication quality in a pseudo manner for each arbitrary frequency band using a frequency domain signal for noise power for each arbitrary frequency band obtained at the noise power calculating section and a frequency domain signal for carrier power for each arbitrary frequency band obtained at the carrier power calculating section.

13. The wireless communication apparatus according to claim 8, wherein the noise power calculating section obtains a frequency domain signal for a noise component from a difference between a received frequency domain signal obtained by the first frequency conversion processing section and a frequency domain signal for the reference signal obtained by the second frequency conversion processing section, obtains a frequency domain signal for noise power using the obtained frequency domain signal for the noise component, adds up frequency domain signals for noise power within OFDM subcarrier frequency band, and thereby obtains a frequency domain signal for noise power for each OFDM subcarrier frequency band.

14. The wireless communication apparatus according to claim 8, wherein the carrier power calculating section obtains a frequency domain signal for carrier power using a frequency domain signal for a reference signal obtained by the second frequency conversion processing section, adds up the frequency domain signals for carrier power within OFDM subcarrier frequency band, and thereby obtains a frequency domain signal for the carrier power for each OFDM subcarrier frequency band.

15. The wireless communication apparatus according to claim 8, wherein the CNR estimating section estimates communication quality in a pseudo manner for each OFDM subcarrier frequency band using a frequency domain signal for noise power for each OFDM subcarrier frequency band obtained by the noise power calculating section and a frequency domain signal for carrier power for each OFDM subcarrier frequency band obtained by the carrier power calculating section.

16. The wireless communication apparatus according to claim 1, wherein a preamble signal of the IEEE802.11b standard is used as the known signal.

17. The wireless communication apparatus according to claim 1, wherein the communication quality estimating section compares the received known signal with the reference signal stored in the reference signal storage section and thereby obtains phase fluctuation between the received known signal and the reference signal, and estimates communication quality in a pseudo manner for the case of transmitting a signal using the wireless communication system based on the second wireless communication standard based on the phase fluctuation.

18. The wireless communication apparatus according to claim 17, wherein the communication quality estimating section obtains a phase difference between phase fluctuation of a current symbol and phase fluctuation of a symbol of one symbol previous to the current symbol, and estimates communication quality in a pseudo manner for the case of transmitting a signal using a wireless communication system based on the second wireless communication standard based on the phase difference.

19. The wireless communication apparatus according to claim 17, wherein the communication quality estimating section comprises:
a fluctuation estimating section that obtains phase fluctuation between the received known signal and the reference signal; and
a DSSS BER estimating section that obtains a phase difference between phase fluctuation of a current symbol and phase fluctuation of a symbol of one symbol previous to the current symbol and estimates communication quality in a pseudo manner using the scale of the phase difference,
wherein the communication quality estimating section estimates communication quality in a pseudo manner for the case of transmitting a signal using the wireless communication system based on the second wireless communication standard.

20. The wireless communication apparatus according to claim 17, wherein the first wireless communication system is a wireless communication system by an OFDM scheme, and the second wireless communication system is a wireless communication system by a DSSS scheme.

21. The wireless communication apparatus according to claim 17, wherein the communication quality estimating section comprises:
a fluctuation estimating section that obtains phase fluctuation between the received known signal and the reference signal; and
a CCKBER estimating section that obtains a phase difference of samples within a symbol, and estimates communication quality in a pseudo manner using the scale of this phase difference,
wherein the communication quality estimating section estimates communication quality in a pseudo manner for the case of transmitting a signal using the wireless communication system based on the second wireless communication standard.

22. The wireless communication apparatus according to claim 17, wherein the first wireless communication system is a wireless communication system of an OFDM scheme, and the second wireless communication system is a wireless communication system of a CCK scheme.

23. The wireless communication apparatus according to claim 20, wherein the first wireless communication system is a wireless communication system complying with the IEEE802.11g standard, and the second wireless communication system is a wireless communication system complying with the IEEE802.11b standard.

24. The wireless communication apparatus according to claim 1, wherein the communication quality estimating section estimates communication quality in a pseudo manner for the case of transmitting a signal at a sampling rate of the second wireless communication standard different from a sampling rate of the first wireless communication standard.

25. The wireless communication apparatus according to claim 24, wherein the communication quality estimating section comprises:
   a received known signal extracting section that extracts a known signal portion from a received signal received at the sampling rate of the first wireless communication standard, converts this to the sampling rate of the second wireless communication standard, and outputs this as a received known signal; and
   a reference signal extracting section that converts the reference signal stored at the sampling rate of the first wireless communication standard to the sampling rate of the second wireless communication standard, and outputs this as a reference signal,
   wherein the communication quality estimating section estimates communication quality in a pseudo manner for the case of transmitting a signal using the wireless communication system based on the second wireless communication standard with a sampling rate different from that of the first wireless communication standard.

26. The wireless communication apparatus according to claim 1, wherein a preamble signal in the IEEE802.11g standard is used as the known signal.

27. The wireless communication apparatus according to claim 1, wherein a signal arranged at a signal segment where a signal series for a fixed segment of a rear end and a signal series for a fixed segment of a front end are the same signal series or at a signal segment where a fixed segment of the front end is excluded from the signal segment, out of the known signal segment inserted by the wireless communication system based on the first wireless communication standard, is used as the known signal.

28. The wireless communication apparatus according to claim 27, the communication quality estimating section further comprising a signal extracting section that extracts a signal segment where a signal series for a fixed segment of a rear end and a signal series for a fixed segment of a front end are the same signal series or a signal segment where the fixed segment of the front end is excluded from the signal segment, from the known signal segment inserted by the wireless communication system based on the first wireless communication standard.

29. A communication quality estimating method that estimates communication quality in a pseudo manner for the ease of transmitting a signal using a wireless communication system based on a second wireless communication standard different from a first wireless communication standard in which frequency band occupied by a wireless signal of the first wireless communication standard is partially or completely overlapped, from a received signal of a signal transmitted using the wireless communication system based on the first wireless communication standard, wherein
   communication quality is estimated in a pseudo manner for the case of transmitting a signal using the wireless communication system based on the second wireless communication standard by carrying out conversion processing specific to the wireless communication system based on the second wireless communication standard on a received signal of the known signal transmitted using the wireless communication system based on the first wireless communication standard and a reference signal, and carrying out comparison.

30. The communication quality estimating method according to claim 29, wherein communication quality is estimated in a pseudo manner for the case of transmitting a signal using the wireless communication system based on the second wireless communication standard using the frequency characteristic of the received signal of the known signal transmitted using the wireless communication system based on the first wireless communication standard and the frequency characteristic of the reference signal.

31. The communication quality estimating method according to claim 29, wherein phase fluctuation between the received known signal and the reference signal is obtained by comparing the received known signal and the reference signal, and communication quality is estimated in a pseudo manner for the case of transmitting a signal using the wireless communication system based on the second wireless communication standard based on the phase fluctuation.

* * * * *

UNITED STATES PATENT AND TRADEMARK OFFICE
CERTIFICATE OF CORRECTION

| | | |
|---|---|---|
| PATENT NO. | : 7,860,047 B2 | |
| APPLICATION NO. | : 11/597054 | |
| DATED | : December 28, 2010 | |
| INVENTOR(S) | : Tomoya Urushihara et al. | |

It is certified that error appears in the above-identified patent and that said Letters Patent is hereby corrected as shown below:

Claim 2, column 41, line 41, incorrectly reads:
"the ease of transmitting a signal using the wireless commu-"
and should read:
"the case of transmitting a signal using the wireless commu-"

Claim 27, column 45, line 36, incorrectly reads:
"series for a fixed segment of a front end arc the same signal"
and should read:
"seried for a fixed segment of a front end are the same signal"

Claim 29, column 46, line 8, incorrectly reads:
"mates communication quality in a pseudo manner for the ease"
and should read:
"mates communication quality in a pseudo manner for the case"

Signed and Sealed this
Fourteenth Day of February, 2012

David J. Kappos
*Director of the United States Patent and Trademark Office*